US012589730B2

(12) United States Patent
Henderson et al.

(10) Patent No.: US 12,589,730 B2
(45) Date of Patent: ***Mar. 31, 2026

(54) VEHICLE MOTION MANAGEMENT BASED ON TORQUE REQUEST WITH SPEED LIMIT

(71) Applicant: VOLVO TRUCK CORPORATION, Gothenburg (SE)

(72) Inventors: Leon Henderson, Härryda (SE); Leo Laine, Härryda Västra Götaland (SE); Andreas Gillström, Västra Frölunda (SE); Mattias Andreasson, Gothenburg (SE); Jerker Lennevi, Lerum (SE); Sidhant Ray, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 640 days.

This patent is subject to a terminal disclaimer.

(21) Appl. No.: 17/758,679

(22) PCT Filed: Dec. 4, 2020

(86) PCT No.: PCT/EP2020/084597
§ 371 (c)(1),
(2) Date: Jul. 12, 2022

(87) PCT Pub. No.: WO2021/144065
PCT Pub. Date: Jul. 22, 2021

(65) Prior Publication Data
US 2023/0047444 A1     Feb. 16, 2023

Related U.S. Application Data

(63) Continuation of application No. PCT/EP2020/050850, filed on Jan. 15, 2020.

(30) Foreign Application Priority Data

Sep. 1, 2020     (EP) ...................................... 20193854
Oct. 22, 2020     (EP) ...................................... 20203236

(Continued)

(51) Int. Cl.
*B60W 30/02*     (2012.01)
*B60T 8/17*     (2006.01)
(Continued)

(52) U.S. Cl.
CPC ............. *B60W 30/02* (2013.01); *B60T 8/175* (2013.01); *B60W 30/18172* (2013.01); *B60W 2520/28* (2013.01); *B60Y 2200/14* (2013.01)

(58) Field of Classification Search
CPC .......... B60W 30/02; B60W 30/18172; B60W 2520/28; B60W 10/184; B60W 10/04;
(Continued)

(56) References Cited

U.S. PATENT DOCUMENTS 5,275,474 A     1/1994     Chin et al.
6,241,326 B1 *     6/2001     Ferguson ................ B60T 8/268
303/177
(Continued)

FOREIGN PATENT DOCUMENTS

CN     104364135 A     2/2015
CN     104718114 A     6/2015
(Continued)

OTHER PUBLICATIONS

Hans Pacejka: "Tyre and vehicle dynamics", 2012, Elsevier Ltd.
SAE Vehicle Dynamics Standards Committee, Jan. 24, 2008 (Jan. 24, 2008).
(Continued)

*Primary Examiner* — Tyler J Lee
(74) *Attorney, Agent, or Firm* — Jeffri A. Kaminski; Venable LLP

(57) ABSTRACT

A vehicle motion management system (260) for a vehicle, the vehicle motion management system being connectable to a motion support system (230230) for communication of control signals therebetween, wherein the vehicle motion management system is configured to: —determine a desired torque for operating the vehicle at a current vehicle operating condition; —determine a wheel slip limit for at least one wheel of the vehicle; —determine, based at least on the wheel slip limit, a wheel speed limit for the at least one wheel of the vehicle; and—transmit a control signal indicative of the desired torque and the wheel speed limit to the motion support system (230).

14 Claims, 7 Drawing Sheets

(30) Foreign Application Priority Data

| | | |
|---|---|---|
| Oct. 22, 2020 | (EP) .................................... | 20203293 |
| Nov. 4, 2020 | (EP) .................................... | 20205699 |
| Nov. 6, 2020 | (EP) .................................... | 20206187 |
| Nov. 9, 2020 | (EP) .................................... | 20206437 |

(51) Int. Cl.
*B60T 8/175*      (2006.01)
*B60W 30/18*      (2012.01)

(58) Field of Classification Search
CPC ......... B60W 2540/10; B60W 2720/10; B60W 2720/26; B60W 2720/28; B60W 2720/30; B60T 8/175; B60T 2270/208; B60Y 2200/14

See application file for complete search history.

(56) References Cited

U.S. PATENT DOCUMENTS

| | | | | |
|---|---|---|---|---|
| 6,542,806 B1 * | 4/2003 | Suhre | ..................... | B60W 30/18 701/82 |
| 6,958,587 B1 * | 10/2005 | Naik | ........................ | H02P 5/747 318/52 |
| 7,957,881 B2 * | 6/2011 | Itoh | ......................... | B60T 8/175 701/87 |
| 8,825,333 B2 * | 9/2014 | Okubo | .................... | B60T 8/172 303/163 |
| 8,983,749 B1 | 3/2015 | Singh | | |
| 9,475,500 B2 | 10/2016 | Grimm et al. | | |
| 10,029,677 B2 * | 7/2018 | Owen | .................... | B60W 30/02 |
| 2003/0111282 A1 * | 6/2003 | Landes | ................. | F02D 41/021 180/197 |
| 2008/0140293 A1 * | 6/2008 | Haller | ..................... | B60T 17/22 701/78 |
| 2014/0117750 A1 * | 5/2014 | McCann | ................. | B60T 8/327 303/119.1 |
| 2014/0167497 A1 * | 6/2014 | McCann | ............... | B60T 8/1769 303/190 |
| 2016/0082972 A1 * | 3/2016 | Fairgrieve | ............. | B60W 50/14 701/84 |
| 2019/0176784 A1 | 6/2019 | Laine et al. | | |
| 2019/0322256 A1 * | 10/2019 | Tha | ......................... | B60T 8/176 |
| 2020/0290617 A1 * | 9/2020 | Walenta | .......... | B60W 30/18145 |
| 2021/0370779 A1 * | 12/2021 | Ford | ....................... | B60L 15/06 |

FOREIGN PATENT DOCUMENTS

| | | | |
|---|---|---|---|
| CN | 107399307 | A | 11/2017 |
| CN | 108791298 | A | 11/2018 |
| CN | 109747434 | A | 5/2019 |
| EP | 1719676 | B1 | 8/2015 |
| JP | S60104428 | A | 6/1985 |
| JP | 2011229286 | A | 11/2011 |
| JP | 2013193566 | A | 9/2013 |
| WO | 2014184344 | A1 | 11/2014 |
| WO | 2019072379 | A1 | 4/2019 |

OTHER PUBLICATIONS

SAE Vehicle Dynamics Standards Committee, Jan. 24, 2008 (Jan. 24, 2008), 73 pages.

International Preliminary Report on Patentability and Written Opinion dated Jul. 19, 2022 in corresponding International PCT Application No. PCT/EP2020/084597, 22 pages.

International Search Report and Written Opinion dated Apr. 20, 2021 in corresponding International PCT Application No. PCT/EP2020/084597, 26 pages.

Chinese Office Action dated Mar. 30, 2024 in corresponding Chinese Patent Application No. 202080093069.7, 15 pages.

Chinese Office Action dated Oct. 8, 2024 in corresponding Chinese Patent Application No. 202080093069.7, 22 pages.

Japan Office Action dated Jun. 9, 2023 in corresponding Japan Patent Application No. 2023510356.

\* cited by examiner

400

500

1500

1502

1504

1500

VEHICLE MOTION MANAGEMENT BASED ON TORQUE REQUEST WITH SPEED LIMIT

CROSS-REFERENCE TO RELATED APPLICATIONS

This application is a U.S. National Stage application of PCT/EP2020/084597, filed Dec. 4, 2020 and published on Jul. 22, 2021, as WO 2021/144065 A1, which claims priority to PCT/EP2020/050850, filed Jan. 15, 2020, EP 20193854.5, filed Sep. 1, 2020, EP 20203236.3 Oct. 22, 2020, EP 20203293.4, filed Oct. 22, 2020, EP 20205699.0 filed Nov. 4, 2020, EP 20206187.5, filed Nov. 9, 2020 and EP 20206437.4, filed Nov. 9, 2020, all of which is hereby incorporated by reference in its entirety.

TECHNICAL FIELD

The present disclosure relates to vehicle motion management for heavy duty vehicles, i.e., coordinated control of motion support devices such as service brakes and propulsion devices.

The invention can be applied in heavy-duty vehicles such as trucks, buses and construction machines. Although the invention will be described mainly with respect to cargo transport vehicles such as semi-trailer vehicles and trucks, the invention is not restricted to this particular type of vehicle but may also be used in other types of vehicles such as cars.

BACKGROUND

Vehicles are becoming ever more complex in terms of mechanics, pneumatics, hydraulics, electronics, and software. A modern heavy duty vehicle may comprise a wide range of different physical devices, such as combustion engines, electric machines, friction brakes, regenerative brakes, shock absorbers, air bellows, and power steering pumps. These physical devices are commonly known as Motion Support Devices (MSD). The MSDs may be individually controllable, for instance such that friction brakes may be applied at one wheel, i.e., a negative torque, while another wheel on the vehicle, perhaps even on the same wheel axle, is simultaneously used to generate a positive torque by means of an electric machine.

Recently proposed vehicle motion management (VMM) functionality executed, e.g., on a central vehicle unit computer (VUC) relies on combinations of the MSDs to operate the vehicle in order to obtain a desired motion effect while at the same time maintaining vehicle stability, cost efficiency and safety. WO2019072379 A1 discloses one such example where wheel brakes are used selectively to assist a turning operation by a heavy duty vehicle.

A commonly applied approach to controlling the various MSDs is to use torque control at the actuator level without any consideration towards wheel slip. However, this approach is not without performance limitations. For instance, in case an excessive wheel slip situation arises, where one or more wheels are slipping in an uncontrolled manner, then a safety function such as traction control and anti-lock brake functions steps in and requests a torque override in order to bring the slip back into control. These safety functions are normally operated by separate control units. If the primary control of the actuator and the slip control functions related to the actuator are allocated to different control units, then the latencies involved in the communication between them may limit the slip control performance. Moreover, the related actuator and slip assumptions made in the plurality of control units which are used to achieve slip control can be inconsistent and this in turn can lead to sub-optimal performance.

There is a need for improved vehicle control methods which handle wheel slip in a better way.

SUMMARY

It is an object of the present disclosure to provide control units and methods which facilitate vehicle control based on slip or wheel speed requests instead of the customary torque requests, which speed or slip requests are obtained based on improved tyre behavioral models.

According to a first aspect, there is provided a vehicle motion management system for a vehicle, the vehicle motion management system being connectable to a motion support system for communication of control signals therebetween, wherein the vehicle motion management system is configured to determine a desired torque for operating the vehicle at a current vehicle operating condition; determine a wheel slip limit for at least one wheel of the vehicle; determine, based at least on the wheel slip limit, a wheel speed limit for the at least one wheel of the vehicle; and transmit a control signal indicative of the desired torque and the wheel speed limit to the motion support system.

The vehicle motion management system and the motion support system are control systems of the vehicle, where each of the control systems is arranged to execute various control functionalities for controlling operation of the vehicle, in particular for controlling wheel operations. According to one example, the vehicle motion management is just a normal driver control input, i.e., manual steering, acceleration and braking input. The vehicle motion management system is preferably configured to receive, and to determine wheel parameters on a higher level, i.e. the vehicle motion management system determines a desired torque and wheel slip limit in a more generalized form, whereas the motion support system is arranged as a lower level control system configured to convert the parameters received from the vehicle motion management system to appropriate parameters for an actuator. The motion support system takes current driveline state(s) into account before forwarding an actuator signal to the actuator. The current driveline state may, for example, relate to a current vehicle transmission state, a gear stage for the vehicle transmission or a transmission clutch actuation state.

The desired torque can, for example, be received from an operator of the vehicle pushing the accelerator pedal and/or pushing the brake pedal. The desired torque can also be received from a system autonomously controlling propulsion operation of the vehicle, or from an advanced driver assistance system (ADAS).

In order to ensure that excessive slip does not occur, two speed limits may be sent to the motor controller in addition to the torque request: An upper speed limit and a lower speed limit. If the current motor speed is within the range defined by the upper and lower limits then the electric motor shall apply torque as requested in the VMM torque request.

At a given time-step if the current motor speed is above the upper limit the motor controller shall reduce the applied motor torque relative to the previous time step. The motor torque shall continue to be reduced until the motor speed is below or equal to the upper speed limit. Also, at a given time-step if the motor speed is measured as being below the lower speed limit then the torque applied to the electric machine shall be increased relative to the last time-step. The motor torque shall continue to be increased until the motor speed is above or equal to the lower speed limit.

Alternatively, the control can be based on reducing a magnitude of the applied torque, not allowing a sign change of the applied torque.

This "over-ride" of the torque control may be terminated if the motor speed returns to a value that is within the range defined by the upper and lower speed limits, or if the VMM torque request received by the motor control is less than the value output from the upper speed limiter. The "over-ride" of the torque control may also be terminated if the VMM torque request received by the motor control is greater than the value output from the lower speed limiter.

The upper and lower speed limits can be calculated based on the current vehicle speed, and a longitudinal slip limit, which may be determined based on an inverse tyre model as will be discussed in more detail below. The speed limits are therefore, according to one example, akin to an allowable motor or wheel speed window located around the current motor or wheel speed. This means that, if a patch of road with reduced friction is encountered, the motor speed may rapidly change speed, but will not cause excessive wheel slip since the speed limit will be exceeded, whereupon torque will be adjusted to keep the speed within the allowable range defined by the upper and the lower speed limits.

Note that all of the states described above, and the speed limits, should be signed. And that, for example, when 'torque is increased' due to the lower speed limit, this shall result in a negative torque value increasing to a less negative torque value; or from a positive torque value to a more positive torque value; or even from a negative value to a positive value. Similar behavior may be implemented for the upper speed limit.

In addition to (or instead of) speed or wheel slip limits, rotational acceleration limits can be sent to the motor controller. These can help prevent the speed limiter, or any other motor control function, from delivering undesirable step changes in torque to the wheels.

The wheel slip limit should be construed as a maximum allowable wheel slip for the at least one wheel during operation. Wheel slip is the relative longitudinal motion between the wheel of the vehicle and the ground surface thereof, i.e. the amount of "skidding". The wheel slip can be determined as a relationship between the longitudinal speed of the wheel and the rotational speed of the wheel taking the wheel radius into account. Accordingly, the wheel speed limit is based on the wheel speed relative to the road surface as seen in a wheel based coordinate system. According to an example embodiment, the vehicle motion management system may be configured to determine a current rotational wheel speed and a current longitudinal wheel speed for at least one of the wheels of the vehicle; and determine a wheel slip for the at least one wheel based on the current rotational wheel speed and the current longitudinal wheel speed.

The present disclosure is at least partly based on the insight that by transmitting a control signal indicative of a desired torque in combination with a wheel speed limit to the motion support system, the calculation of wheel slip limit can be executed by the higher level vehicle motion management system. When calculating wheel slip, the denominator in the wheel slip equation consists of the rotational wheel speed of the wheel. In low speed operation of the vehicle, the denominator is thus close to zero, or approaches zero which could result in a source of error when calculating wheel slip. Executing the wheel slip in the higher level vehicle motion management system is thus advantageous as potential inconsistencies in wheel slip calculation by separate motion support systems can be avoided. An improved wheel slip consistency is hereby achieved.

Furthermore, transmitting a control signal indicative of the desired torque and the wheel speed limit to the motion support system is particularly advantageous when operating the vehicle using electric machines, as electric machines are able to be speed- and torque controlled. As opposed to slip control, speed control can also be easier to achieve for e.g. service brakes, since rotation speed is a commonly used output of a tire torque balancing system and does not include any of the non-linearities which is present in a wheel slip equation.

According to an example embodiment, the wheel speed limit may be further based on the desired torque. Hereby, the desired torque, i.e. a torque request, is used for calculating a slip limit which slip limit is used when calculating the wheel speed limit.

According to an example embodiment, the wheel speed limit may comprise an upper wheel speed limit and a lower wheel speed limit. The vehicle motion management system may be further configured to transmit the upper wheel speed limit to the motion support system at least when the desired torque is above zero; and transmit the lower wheel speed limit to the motion support system at least when the desired torque is below zero.

An advantage is that different wheel speed limits can be used in dependence of vehicle acceleration or vehicle deceleration.

According to an example embodiment, the vehicle motion management system may be further configured to determine an offset wheel speed parameter; obtain a signal indicative of a wheel speed for the vehicle; and determine the wheel slip limit based on the offset wheel speed parameter when the wheel speed is below a threshold vehicle speed limit.

The offset wheel speed parameter is advantageously used when the wheel speed is relatively low, such as close to zero. As described above, the wheel slip limit can be difficult to correctly calculate at low speeds due to the denominator of the wheel slip calculation model. Setting an offset wheel speed parameter thus advantageously remedies this potential inconsistency. The offset wheel speed parameter may be an upper offset wheel speed parameter and a lower offset wheel speed parameter, where the upper offset wheel speed parameter is higher than the current vehicle speed, and the lower offset wheel speed parameter is lower than the current vehicle speed. The offset wheel speed parameter can be obtained by using a tire model to map the offset wheel speed parameter to a desired torque.

According to an example embodiment, the wheel slip limit may be within a predetermined wheel slip range. Hereby, the wheel of the vehicle will not be exposed to a too severe wheel slip or a too low wheel slip.

According to an example embodiment, the vehicle motion management system may be further configured to obtain a signal indicative of a current accelerator pedal position of an accelerator pedal of the vehicle; and determine the desired torque based on the current accelerator pedal position. However, and according to an example embodiment, the desired torque may instead be determined based on a signal received from an autonomous vehicle operating system. According to a further alternative as indicated above, the vehicle motion management system may also be configured to obtain a signal indicative of a brake pedal position for determining the desired torque, or from a so-called retarder stalk position of a retarder of the vehicle. The vehicle motion management system can thus be arranged in an autonomously controlled vehicle as well as a driver controlled vehicle.

According to an example embodiment, the vehicle motion management system may be further configured to determine a wheel friction level between the at least one wheel and a road surface; and determine the current vehicle operating condition based on the determined wheel friction level. Other alternatives of determining the current vehicle operating condition. For example, the current weight of the vehicle, i.e. the weight of a laden vehicle, the road topology at which the vehicle is current operated, etc. can also, as alternatives, or in conjunction with the wheel friction level, be used as input parameters when determining the current vehicle operating condition.

According to a second aspect, there is provided a motion support system for a vehicle, the motion support system being connectable to the above described vehicle motion management system and to at least one actuator configured to apply a torque to at least one wheel of the vehicle, wherein the motion support system is configured to receive a control signal from the vehicle motion management system, the control signal being indicative of a desired torque for operating the vehicle at a current vehicle operating condition, and indicative of a wheel speed limit for the at least one wheel of the vehicle; determine a current vehicle driveline state for the vehicle; determine, based on the current vehicle driveline state, the desired torque and the wheel speed limit, an operating torque and an actuator rotational speed limit; and transmit an actuator signal to the actuator for the actuator to generate the operating torque on the at least one wheel without exceeding the actuator rotational speed limit.

The current driveline state should be construed as a current operating mode of the driveline, and in particular the transmission of the driveline. According to an example embodiment, the current vehicle driveline state may be one of a current vehicle transmission state, a gear stage for the vehicle transmission or a transmission clutch actuation state. Hereby, and as indicated above, the motion support system is arranged as a lower level control system configured to convert the parameters received from the vehicle motion management system to appropriate parameters for an actuator taking the current driveline state into consideration.

According to an example embodiment, the wheel motion system may be a decentralized wheel motion system connectable to a wheel specific actuator configured to control a single wheel of the vehicle.

Using a decentralized wheel motion system enables for rapid response to the specific actuator it is connected to, which hence improves the operational propulsion/braking performance of the vehicle. The decentralized wheel motion system can be connected to a separate vehicle motion management system, or connected to a central vehicle motion management system, which central vehicle motion management system is connected to a plurality of decentralized wheel motion systems.

Further effects and features of the second aspect are largely analogous to those described above in relation to the first aspect. By means of the above described first and second aspects, a vehicle control system is thus provided which comprises the vehicle motion management system as defined by any one of the embodiments of the first aspect, and a motion control system as defined by any one of the embodiments of the second aspect.

According to a third aspect, there is provided a method for controlling an actuator of a vehicle, the actuator being configured to apply a torque on at least one wheel of the vehicle, wherein the method comprises determining a desired torque for operating the vehicle at a current vehicle operating condition; determining a wheel slip limit for the at least one wheel of the vehicle; determining, based at least on the wheel slip limit, a wheel speed limit for the at least one wheel of the vehicle; determining an operating torque and an actuator rotational speed limit based on the desired torque, the wheel speed limit and a current vehicle driveline state; and controlling the actuator to generate the operating torque on the at least one wheel without exceeding the actuator rotational speed limit.

Effects and features of the third aspect are largely analogous to those described above in relation to the first and second aspects. Thus, features described above in relation to the vehicle motion management system as well as the motion support system are applicable to the method described in the third aspect.

According to a fourth aspect, there is provided a control signal representing instructions to be executed by a motion support system, the control signal comprising a torque component enabling the motion support system to determine an operating torque; and a wheel speed limit component representing wheel speed limit data which, when executed by the motion support system, cause the motion support system to generate an actuator signal corresponding to the operation torque subject to an actuator rotational speed limit, which is determinable based on the wheel speed limit component in view of a current vehicle driveline state.

According to a fifth aspect, there is provided a computer program comprising program code means for performing the steps of the above described third aspect when the program is run on a computer.

According to a sixth aspect, there is provided a computer readable medium carrying a computer program comprising program means for performing the steps of the above described third aspect when the program means is run on a computer.

According to an example of this method, VMM (vehicle motion management) sends a torque request to the electric machine, the torque request could (for example) represent the torque request coming from the driver's accelerator pedal (positive torque request), or it could be a request for braking torque request (negative torque request).

The object is also at least in part obtained by a control unit for controlling a heavy duty vehicle. The control unit is arranged to obtain input data indicative of a desired wheel force to be generated by at least one wheel of the vehicle, and to translate the input data into a respective equivalent wheel speed (or, equivalently, motor speed) or wheel slip to be maintained by the wheel in order to generate the desired wheel force based on an inverse tyre model for the wheel. The control unit is arranged to obtain the inverse tyre model in dependence of a current operating condition of the wheel, and to control the heavy duty vehicle based on the equivalent wheel speed or wheel slip.

Thus, instead of requesting torques from the different actuators as is customary, wheel slip limit requests are sent to the wheel torque actuators at wheel end, which are then tasked with maintaining operation below the requested wheel slip limits. This way the control of the MSDs is moved closer to wheel end, where a higher bandwidth control is possible due to the reduced control loop latencies and faster processing which is often available closer to wheel end. The MSDs are thereby able to react much more quickly to changes in, e.g., road friction, and thus provide a more stable wheel force despite variable operating conditions. Compared to legacy torque-based control, this approach to MSD control improves both startability of heavy duty vehicles, and also maneuvering in higher speed driving scenarios. For instance, if a wheel temporarily leaves the ground or experiences significantly reduced vertical force due to a bump in the road, the wheel will not spin out of control. Rather, the MSD control will quickly reduce applied torque to maintain wheel slip at the requested value, i.e., below the slip limit, such that when the wheel again touches ground, the proper wheel speed will be maintained.

It is a further advantage that the inverse tyre model is adjusted to account for variations in the current operating conditions of the wheel, since this improves the accuracy and robustness of the mapping between desired wheel force and equivalent wheel speed or wheel slip. This way, when operating conditions change, the inverse tyre model will be adjusted to better model the current operating conditions. Thus, as the operating conditions change for a given wheel, the mapping between wheel force and wheel slip (or wheel speed) also changes to compensate for the change in operating condition.

The control unit may also be arranged to allocate, i.e., request, a steering angle to be maintained at one or more steered wheels on the vehicle in addition to wheel slip or wheel speed. This steering angle will have an effect on wheel lateral slip. It is therefore often an advantage to treat steering and wheel torque (slip or speed) jointly, since this often improves overall vehicle control in terms of both robustness and efficiency.

According to aspects, the data indicative of the desired wheel force comprises a desired wheel torque and a wheel rolling radius. This means that the inverse tyre model interface can accommodate a function which outputs requested torque, such as a legacy vehicle control function, which together with wheel radius represents or is indicative of a desired wheel force.

According to aspects, the current operating condition comprises a vehicle or wheel speed over ground vector. Knowing wheel speed over ground, it becomes possible to control wheel rotational velocity to maintain wheel slip at a desired level. The wheel speed over ground can also have an effect on the mapping between wheel force and wheel slip. For instance, the contact patch between ground and the wheel may change in dependence of vehicle speed.

According to aspects, the current operating condition comprises a normal load of the wheel or a vertical force acting on the wheel. The normal load of a given wheel, together with friction coefficient, determines the maximum achievable wheel force. Thus, the inverse tyre model is preferably adjusted to account for variation in normal load. By measuring or otherwise determining normal load, the inverse tyre model can be made more accurate.

According to aspects, the current operating condition comprises an estimated or otherwise determined tyre stiffness of the wheel. The tyre stiffness has a large impact on the inverse tyre model in a linear region from low to medium wheel slips. By accounting for changes in tyre stiffness, a more accurate inverse tyre model can be obtained. The tyre stiffness is optionally corrected for factors related to the tyre on a given wheel, such as wear, age, temperature, inflation pressure, etc. The tyre stiffness can either be only the longitudinal slip stiffness which can be used as a basis to scale the lateral slip stiffness or a vector comprising both the longitudinal and the lateral slip stiffness.

According to aspects, the current operating condition comprises a tyre road friction coefficient associated with the wheel. The tyre road friction coefficient also has an impact on the mapping between wheel force and wheel slip, among other things since it has an impact on the maximum achievable tyre force. An estimated road friction parameter can be used to adapt the tyre force curve to limit the peak force allowed and also to change the peak force slip position of the inverse tyre model.

According to aspects, the current operating condition comprises a minimum required lateral force of the wheel. This means that it becomes possible to require operation with a minimum lateral force generation capability of a given wheel. For instance, if the vehicle is turning, a certain amount of lateral force may need to be generated in order to successfully complete the turn. With a requirement on lateral force, the wheel speed may need to be limited to wheel slips below the requested wheel slip. Similarly, the current operating condition optionally comprises a maximum allowed lateral slip angle of the wheel. With minimum required lateral force and maximum allowed lateral slip angle, the longitudinal slip request generated is limited to a search space where a minimum lateral force capacity is guaranteed using a maximum allowed lateral slip angle. Although both are optional arguments, they can be advantageously used to request longitudinal force in a safe manner that does not cause issues with, e.g., yaw instability and the like. The minimum required lateral force parameter can be used by a vehicle controller to ensure that enough lateral force capacity remains to be able to negotiate a given path having a certain acceleration profile and a curvature profile. The maximum longitudinal velocity of a vehicle throughout a maneuver is normally limited by roll stability and road friction. To know what range of lateral accelerations that can be supported by a vehicle unit negotiating a turning maneuver, the lateral force capability may be necessary to know. Thus, being able to specify a minimum required lateral force capability is an advantage.

The maximum allowed lateral slip angle can be used by the vehicle controller to ensure that the yaw moment balance or the side-slip of the vehicle is maintained at acceptable levels in agreement with the maneuver to be executed. This feature can be of particular benefit in autonomous or functional safety critical applications where it is desired to keep the tyres operating in their linear combined-slip range and therefore preventing any traction control or yaw stability interventions which may cause effects that are difficult to predict.

According to aspects, the inverse tyre model is configured to provide a remaining lateral force capacity of the wheel. The remaining lateral force capacity can be used to adjust bounds on the requests being sent to wheel end or as feedback to a control allocator to adapt its control requests to increase lateral force capacity of the wheel if it becomes too low for the current driving scenario.

According to aspects, the inverse tyre model is configured to provide a gradient of the desired wheel force with respect to wheel speed or wheel slip at a tyre operating point associated with the desired wheel force and the current operating condition of the wheel. This output can be used to, e.g., custom tune the gains to the speed controller in the actuator depending on the priority of the control allocator. For instance, if the vehicle is cornering and the lateral gradient value is high, it indicates that poor speed control performance can degrade the lateral cornering performance and hence the gains for the speed controller can be adapted to mitigate this problem. Knowing the gradients can also help in performing analysis on stability and control robustness, which is an advantage.

According to aspects, the control unit is arranged to store a pre-determined inverse tyre model in memory, wherein the inverse tyre model is stored in the memory as a function of the current operating condition of the wheel. This means that the control unit has access to a range of different models, and it can select a suitable model from the range of models.

According to aspects, the control unit is arranged to adapt the inverse tyre model based on a measured wheel behavior and/or vehicle behavior in response to the control of the heavy duty vehicle based on the equivalent wheel speed or wheel slip. Thus, advantageously, the control unit monitors the actual response by the wheel, and possibly also by the vehicle, and adjusts the inverse tyre model accordingly. This means that the control method becomes less sensitive to assumptions made on the performance of the vehicle in different scenarios or the impact of different parameters on the controllability of the vehicle. Also, if the operating conditions change in an unexpected manner, the inverse tyre model will adapt to the change, thereby providing robust control also in scenarios which have not yet been encountered.

According to aspects, the inverse tyre model is adjusted to always lie within pre-determined upper and/or lower limits on wheel force in dependence of wheel slip or wheel speed. This means that model adjustment of the inverse tyre model is allowed, but only within some predetermined boundaries. The boundary or boundaries therefore represent a safe-guard against unforeseen error in the model adaptation process. One example of an adaptive inverse tyre model is an artificial neural network which is continuously or at least regularly trained based on control input and actual wheel response or vehicle response to the control input.

There is also disclosed herein computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

It is furthermore appreciated that, even though some features are discussed separate from other features, all the features discussed herein can be implemented with advantage and used to control the same vehicle. The various features, algorithms, and devices disclosed herein are therefore to be considered in combination as well as separate from each other.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
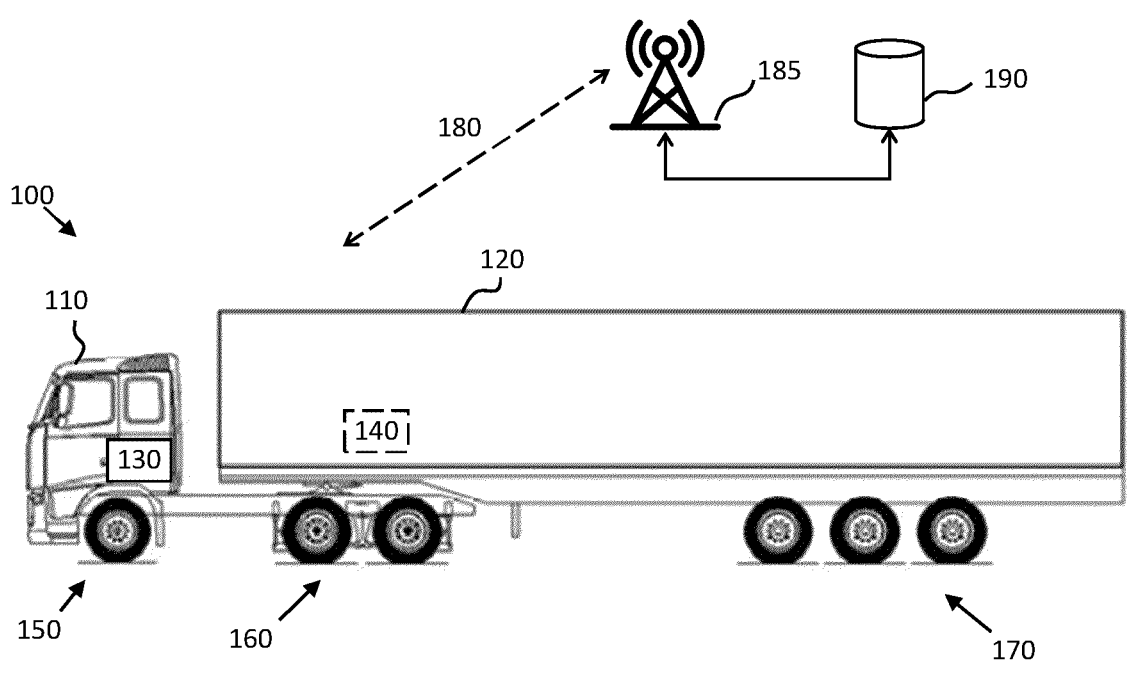
FIG. 1 shows an example heavy duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The vehicle 100 comprises a tractor or towing vehicle 110 supported on front wheels 150 and rear wheels 160, at least some of which are driven wheels. Normally but not necessarily, all the wheels on the tractor are braked wheels. The tractor 110 is configured to tow a first trailer unit 120 supported on trailer wheels 170 by a fifth wheel connection in a known manner. The trailer wheels are normally braked wheels but may also comprise driven wheels on one or more axles.

It is appreciated that the herein disclosed methods and control units can be applied with advantage also in other types of heavy duty vehicles, such as trucks with drawbar connections, construction equipment, buses, and the like. This disclosure presents a number of complementary techniques methods and control units for controlling a heavy duty vehicle based at least in part on a relationship between wheel force and wheel slip, as set out in the appended list of claims.

The tractor 110 comprises a vehicle unit computer (VUC), or control unit, 130 for controlling various kinds of functionality, i.a. to achieve propulsion, braking, and steering. Some trailer units 120 also comprise a VUC or control unit 140 for controlling various functions of the trailer, such as braking of trailer wheels, and sometimes also trailer wheel propulsion. The VUCs 130, 140 may be centralized or distributed over several processing circuits. Parts of the vehicle control functions may also be executed remotely, e.g., on a remote server 190 connected to the vehicle 100 via wireless link 180 and a wireless access network 185.

The VUC 130 on the tractor 110 (and possibly also the VUC 140 on the trailer 120) may be configured to execute vehicle control methods which are organized according to a layered functional architecture where some functionality may be comprised in a traffic situation management (TSM) domain in a higher layer and some other functionality may be comprised in a vehicle motion management (VMM) domain residing in a lower functional layer.

Figure 2:
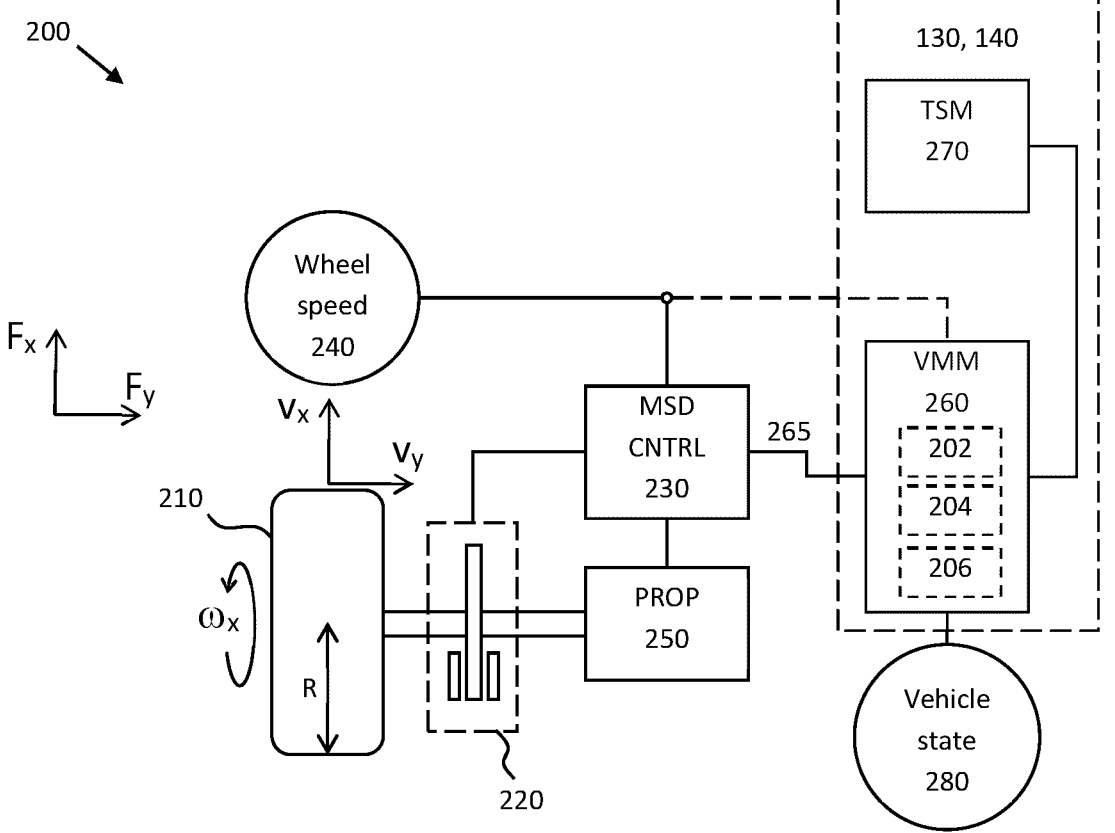
FIG. 2 schematically illustrates a motion support device arrangement.

FIG. 2 schematically illustrates functionality 200 for controlling a wheel 210 by some example MSDs, or actuators, here comprising a friction brake 220 (such as a disc brake or a drum brake) and a propulsion device 250. The friction brake 220 and the propulsion device are examples of wheel torque generating devices, which may also be referred to as actuators and which can be controlled by one or more motion support device control units 230. The control is based on, e.g., measurement data obtained from a wheel speed sensor 240 and from other vehicle state sensors 280, such as radar sensors, lidar sensors, and also vision based sensors such as camera sensors and infra-red detectors. Other example torque generating motion support devices which may be controlled according to the principles discussed herein comprise engine retarders and power steering devices. An MSD control unit 230 may be arranged to control one or more actuators. For instance, it is not uncommon that an MSD control unit 230 is arranged to control both wheels on an axle.

Herein, the terms MSD controller, MSD control function, motion support system, actuator control system, and wheel motion system may be used interchangeably with the term MSD control unit.

The TSM function 270 plans driving operation with a time horizon of, e.g., 10 seconds or so. This time frame corresponds to, e.g., the time it takes for the vehicle 100 to negotiate a curve. The vehicle maneuvers, planned and executed by the TSM, can be associated with acceleration profiles and curvature profiles which describe a desired vehicle velocity and turning for a given maneuver. The TSM continuously requests the desired acceleration profiles $a_{req}$ and curvature profiles $c_{req}$ from the VMM function 260 which performs force allocation to meet the requests from the TSM in a safe and robust manner. The VMM function 260 continuously feeds back capability information to the TSM function detailing the current capability of the vehicle in terms of, e.g., forces, maximum velocities, and accelerations which can be generated.

Acceleration profiles and curvature profiles may also be obtained from a driver of the heavy duty vehicle via normal control input devices such as a steering wheel, accelerator pedal and brake pedal. The source of said acceleration profiles and curvature profiles is not within scope of the present disclosure and will therefore not be discussed in more detail herein. Advanced VMM functions may be combined with legacy manual driver control input to form advanced driver assistance systems (ADAS).

Figure 3:
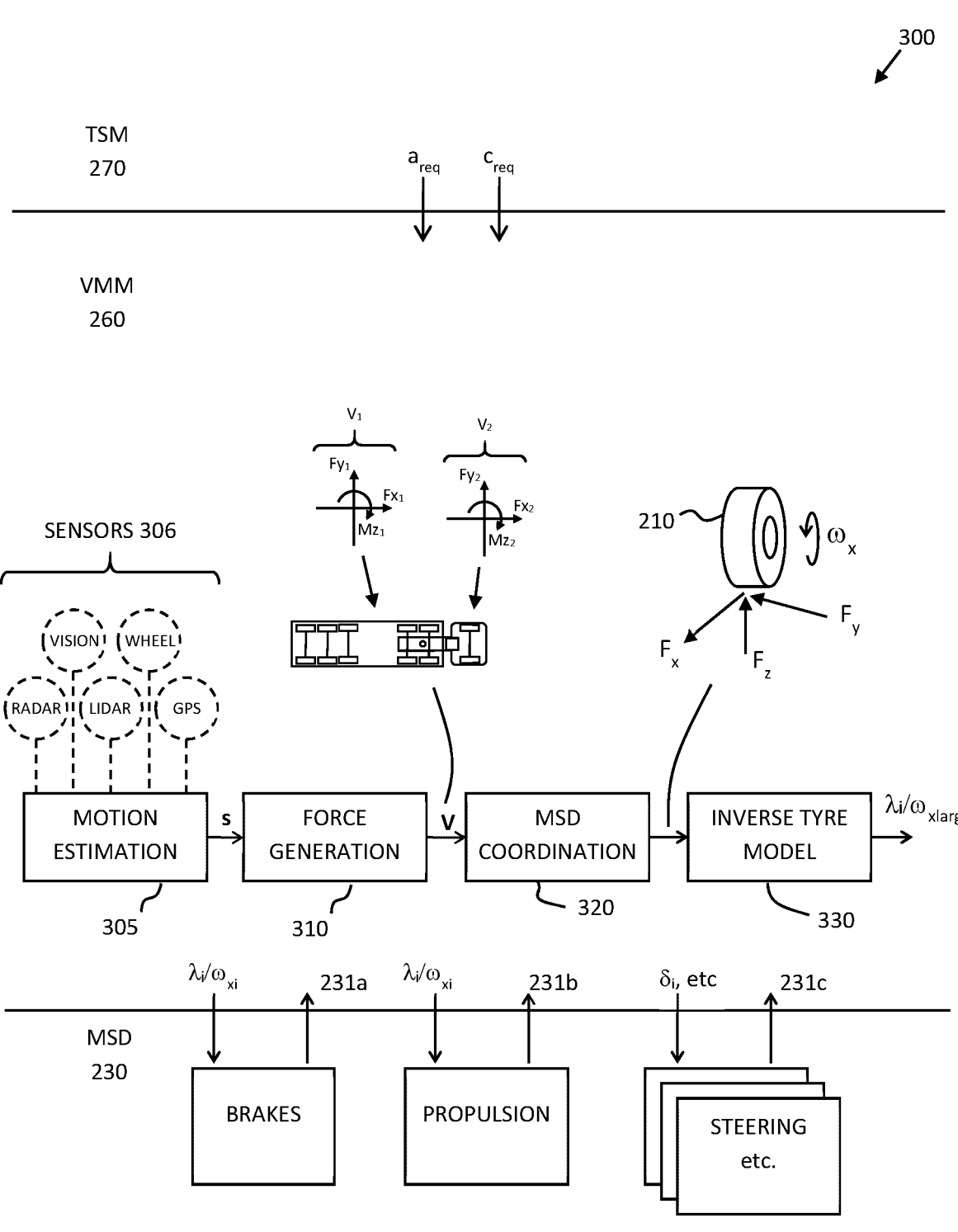
FIG. 3 illustrates vehicle control functions.

With reference also to FIG. 3, which shows a vehicle control functionality 300, the VMM function 260 operates with a time horizon of about 1 second or so, and continuously transforms the acceleration profiles $a_{req}$ and curvature profiles $c_{req}$ into control commands for controlling vehicle motion functions, actuated by the different MSDs 220, 250 of the vehicle 100 which report back capability information 321*a-c* to the VMM, which in turn are used as constraints in the vehicle control. The VMM function 260 performs vehicle state or motion estimation 305, i.e., the VMM function 260 continuously determines a vehicle state s comprising positions, speeds, accelerations and articulation angles of the different units in the vehicle combination by monitoring operations using various sensors 306 arranged on the vehicle 100, often but not always in connection to the MSDs 220, 250.

The result of the motion estimation 305, i.e., the estimated vehicle state s, is input to a force generation module 310 which determines the required global forces $V=[V_1, V_2]$ for the different vehicle units to cause the vehicle 100 to move according to the requested acceleration and curvature profiles $a_{req}$, $c_{req}$. The required global force vector V is input to an MSD coordination function 320 which allocates wheel forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination 100.

By determining vehicle unit motion using, e.g., global positioning systems, vision-based sensors, wheel speed sensors, radar sensors and/or lidar sensors, and translating this vehicle unit motion into a local coordinate system of a given wheel 210 (in terms of, e.g., longitudinal and lateral velocity components), it becomes possible to accurately estimate wheel slip in real time by comparing the vehicle unit motion in the wheel reference coordinate system to data obtained from the wheel speed sensor 240 arranged in connection to the wheel 210.

A tyre model, which will be discussed in more detail in connection to FIG. 4 below, can be used to translate between a desired longitudinal tyre force $Fx_i$ for a given wheel i and an equivalent wheel slip $\lambda_i$ for the wheel. Wheel slip $\lambda$ relates to a difference between wheel rotational velocity and speed over ground and will be discussed in more detail below. Wheel speed $\omega$ is a rotational speed of the wheel, given in units of, e.g., rotations per minute (rpm) or angular velocity in terms radians/second (rad/sec) or degrees/second (deg/sec).

Herein, a tyre model is a model of wheel behavior which describes wheel force generated in longitudinal direction (in the rolling direction) and/or lateral direction (orthogonal to the longitudinal direction) as function of wheel slip. In "Tyre and vehicle dynamics", Elsevier Ltd. 2012, ISBN 978-0-08-097016-5, Hans Pacejka covers the fundamentals of tyre models. See, e.g., chapter 7 where the relationship between wheel slip and longitudinal force is discussed.

To summarize, the VMM function 260 manages both force generation and MSD coordination, i.e., it determines what forces that are required at the vehicle units in order to fulfil the requests from the TSM function 270, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

The interface 265 between VMM and MSDs capable of delivering torque to the vehicle's wheels has, traditionally, been focused on torque based requests to each MSD from the VMM without any consideration towards wheel slip. However, this approach has significant performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance.

Significant benefits can be achieved by instead using a wheel speed or wheel slip based request on the interface 265 between VMM and the MSD controller or controllers 230, thereby shifting the difficult actuator speed control loop to the MSD controllers, which generally operate with a much shorter sample time compared to that of the VMM function. Such an architecture can provide much better disturbance rejection compared to a torque based control interface and thus improves the predictability of the forces generated at the tyre road contact patch.

With reference to FIG. 3, the inverse tyre model block 330 translates the required wheel forces $Fx_i$, $Fy_i$ determined for each wheel, or for a subset of wheels, by the MSD coordination block 320 into equivalent wheel speeds $\omega_{wi}$ or wheel slips $\lambda_i$. These wheel speeds or slips are then sent to the respective MSD controllers 230. The MSD controllers report back capabilities 231a-231c which can be used as constraints in, e.g., the MSD coordination block 320.

Longitudinal wheel slip $\lambda$ may, in accordance with SAE J670 (SAE Vehicle Dynamics Standards Committee Jan. 24, 2008) be defined as $$\lambda = \frac{R\omega_x - v_x}{\max(|R\omega|, |v_x|)}$$

where R is an effective wheel radius in meters, $\omega_x$ is the angular velocity of the wheel, and $v_x$ is the longitudinal speed of the wheel (in the coordinate system of the wheel). Thus, A is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

The VMM 260 and optionally also the MSD control unit 230 maintains information on $v_x$ (in the reference frame of the wheel), while a wheel speed sensor 240 or the like can be used to determine $\omega_x$ (the rotational velocity of the wheel).

In order for a wheel (or tyre) to produce a wheel force, slip must occur. For smaller slip values the relationship between slip and generated force are approximately linear, where the proportionality constant is often denoted as the slip stiffness of the tyre. A tyre 210 is subject to a longitudinal force $F_x$, a lateral force $F_y$, and a normal force $F_z$. The normal force $F_z$ is key to determining some important vehicle properties. For instance, the normal force to a large extent determines the achievable longitudinal tyre force $F_x$ by the wheel since, normally, $F_x \leq \mu F_z$, where $\mu$ is a friction coefficient associated with a road friction condition. The maximum available lateral force for a given longitudinal slip can be described by the so-called Magic Formula as described in "Tyre and vehicle dynamics", Elsevier Ltd. 2012, ISBN 978-0-08-097016-5, by Hans Pacejka.

Instead of requesting wheel slip or wheel speed directly from the MSD, a torque request with speed limit interface can be used. The torque request is then allowed to influence the wheel behavior as long as the wheel speed remains in-between high and low wheel speed limits. The wheel slip or wheel speed limit can be configured based on the above-mentioned desired wheel slip for obtaining a given force, or it can be configured with a margin to the desired wheel slip or wheel speed.

In order to ensure excessive slip does not occur, two speed limits may be sent to the motor controller in addition to the torque request: An upper speed limit and a lower speed limit. Some example implementations may only use an upper speed limit. A limit on wheel speed may be considered equivalent to a limit on motor speed from a functional point of view. Similarly, a limit on wheel or motor speed can be translated into a limit on wheel slip given the current vehicle speed over ground in the reference system of a given wheel.

If the current motor speed is within the range defined by the upper and lower limits then the electric motor shall apply torque as requested in the VMM torque request. It is appreciated that wheel speed and motor speed are tightly related. If the electric machine is connected to one or more wheels via a transmission then the transmission determines the conversion between motor speed and wheel speed. If the wheel is connected to the electric machine via a differential, then the torque and wheel speeds are distributed over the wheels in a known manner.

At a given time-step if the current motor speed is above the upper speed limit, the motor controller operate to reduce the applied motor torque relative to the previous time step. This causes the wheel speed to drop and eventually to go below the configured wheel speed limit. The motor torque shall continue to be reduced until the motor speed is below or equal to the upper speed limit. Also, at a given time-step if the motor speed is measured as being below the lower speed limit then the torque applied to the electric machine shall be increased relative to the last time-step. This causes the wheel speed to increase. The motor torque shall continue to be increased until the motor speed is above or equal to the lower speed limit. Other ways to implement the actual control could be to use a variable step-size for the torque control, or to switch to wheel speed control if the wheel speed or wheel slip goes beyond the configured limits.

The herein disclosed method need not necessarily be implemented by executing control in discrete time steps. Thus, alternatively, if it is detected that the current motor speed (or wheel speed) is above the configured upper limit the motor controller continuously reduces the applied motor torque in a controlled manner while observing motor speed and/or wheel speed. The motor torque shall continue to be reduced until the motor or wheel speed is below or equal to the upper speed limit. Also, if it is detected that the motor speed (or wheel speed) is measured as being below the lower speed limit then the torque applied to the electric machine is continuously increased. The motor torque shall continue to be increased until the motor speed is above or equal to the lower speed limit.

Alternatively, the control can be based on reducing a magnitude of the applied torque, not allowing a sign change of the applied torque.

This "over-ride" of the torque control may be terminated if the motor speed returns to a value that is within the range defined by the upper and lower speed limits, or if the VMM torque request received by the motor control is less than the value output from the upper speed limiter. The "over-ride" of the torque control may also be terminated if the VMM torque request received by the motor control is greater than the value output from the lower speed limiter.

The upper and lower speed limits can be calculated based on the current vehicle speed, and a longitudinal slip limit, which may be determined based on an inverse tyre model as will be discussed in more detail below.

Note that all of the states described above, and the speed limits, are signed values. Note also that, for example, when 'torque is increased' due to the lower speed limit, this shall result in a negative torque value increasing to a less negative torque value; or from a positive torque value to a more positive torque value; or even from a negative value to a positive value. Similar behavior may be implemented for the upper speed limit.

In addition to (or instead of) speed or wheel slip limits, rotational acceleration limits can be sent to the motor controller. These can help prevent the speed limiter, or any other motor control function, from delivering undesirable step changes in torque to the wheels. Wheel slip limits can of course also be used, as will be explained in more detail in the following.

The upper and lower speed limits can be calculated based on the current vehicle speed, and a longitudinal slip limit, which may be determined based on an inverse tyre model as will be discussed in more detail below. The speed limits are therefore, according to one example, akin to an allowable motor or wheel speed window located around the current motor or wheel speed. This means that, if a patch of road with reduced friction is encountered, the motor speed may rapidly change speed, but will not cause excessive wheel slip since the speed limit will be exceeded, whereupon torque will be adjusted to keep the speed within the allowable range defined by the upper and the lower speed limits.

Note that all of the states described above, and the speed limits, should be signed. And that, for example, when 'torque is increased' due to the lower speed limit, this shall result in a negative torque value increasing to a less negative torque value; or from a positive torque value to a more positive torque value; or even from a negative value to a positive value. Similar behavior may be implemented for the upper speed limit.

Figure 4:
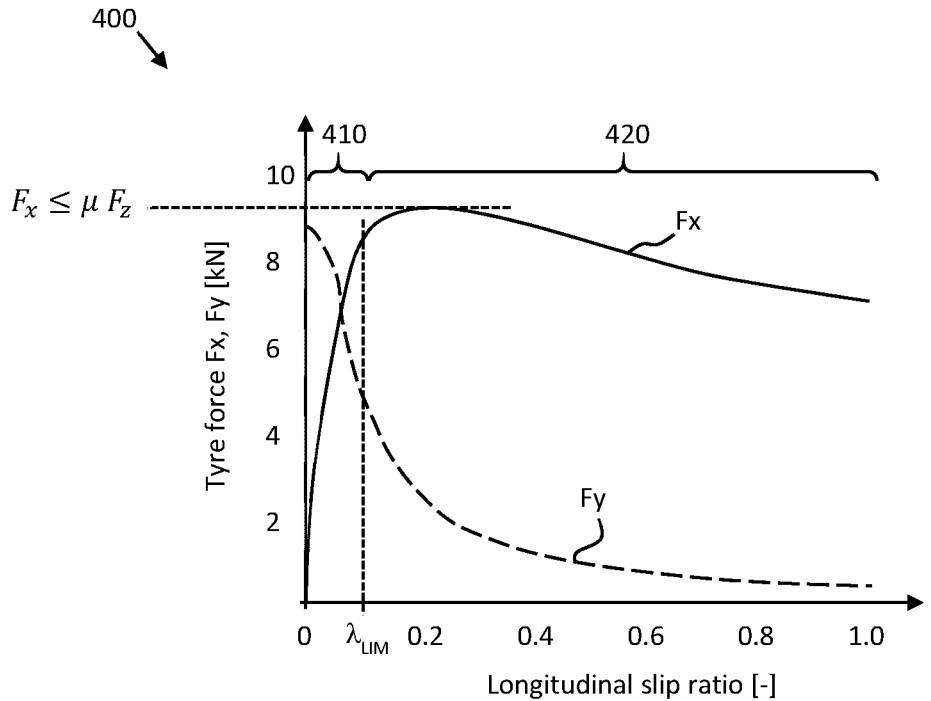
FIG. 4 is a graph showing tyre force as function of wheel slip.

FIG. 4 is a graph showing an example of achievable tyre force as function of wheel slip. The longitudinal tyre force Fx shows an almost linearly increasing part 410 for small wheel slips, followed by a part 420 with more non-linear behaviour for larger wheel slips. The obtainable lateral tyre force Fy decreases rapidly even at relatively small longitudinal wheel slips. It is desirable to maintain vehicle operation in the linear region 410, where the obtainable longitudinal force in response to an applied brake command is easier to predict, and where enough lateral tyre force can be generated if needed. To ensure operation in this region, a wheel slip limit $\lambda_{LIM}$ on the order of, e.g., 0.1, can be imposed on a given wheel. For larger wheel slips, e.g., exceeding 0.1, a more non-linear region 420 is seen. Control of a vehicle in this region may be difficult and is therefore often avoided. It may be interesting for traction in off-road conditions and the like where a larger slip limit for traction control might be preferred, but not for on-road operation.

This type of tyre model can be used by the VMM 260 to generate a desired tyre force at some wheel. Instead of requesting a torque corresponding to the desired tyre force, the VMM can translate the desired tyre force into an equivalent wheel slip (or, equivalently, a wheel speed relative to a speed over ground) and request this slip instead. The main advantage being that the MSD control device 230 will be able to deliver the requested torque with much higher bandwidth by maintaining operation at the desired wheel slip, using the vehicle speed $v_x$ and the wheel rotational velocity $\omega_x$.

The control unit 130, 140 can be arranged to store a pre-determined inverse tyre model $f^{-1}$ in memory, e.g., as a look-up table. The inverse tyre model is arranged to be stored in the memory as a function of the current operating condition of the wheel 210. This means that the behavior of the inverse tyre model is adjusted in dependence of the operating condition of the vehicle, which means that a more accurate model is obtained compared to one which does not account for operating condition. The model which is stored in memory can be determined based on experiments and trials, or based on analytical derivation, or a combination of the two. For instance, the control unit can be configured to access a set of different models which are selected depending on the current operating conditions. One inverse tyre model can be tailored for high load driving, where normal forces are large, another inverse tyre model can be tailored for slippery road conditions where road friction is low, and so on. The selection of a model to use can be based on a pre-determined set of selection rules. The model stored in memory can also, at least partly, be a function of operating condition. Thus, the model may be configured to take, e.g., normal force or road friction as input parameters, thereby obtaining the inverse tyre model in dependence of a current operating condition of the wheel 210. It is appreciated that many aspects of the operating conditions can be approximated by default operating condition parameters, while other aspects of the operating conditions can be roughly classified into a smaller number of classes. Thus, obtaining the inverse tyre model in dependence of a current operating condition of the wheel 210 does not necessarily mean that a large number of different models need to be stored, or a complicated analytical function which is able to account for variation in operating condition with fine granularity. Rather, it may be enough with two or three different models which are selected depending on operating condition. For instance, one model to be used when the vehicle is heavily loaded and another model to be used otherwise. In all cases, the mapping between tyre force and wheel slip changes in some way in dependence of the operating condition, which improves the precision of the mapping.

The inverse tyre model may also be implemented at least partly as an adaptive model configured to automatically or at least semi-automatically adapt to the current operating conditions of the vehicle. This can be achieved by constantly monitoring the response of a given wheel in terms of wheel force generated in response to a given wheel slip request, and/or monitoring the response of the vehicle 100 in response to the wheel slip requests. The adaptive model can then be adjusted to more accurately model the wheel forces obtained in response to a given wheel slip request from a wheel.

Figure 5:
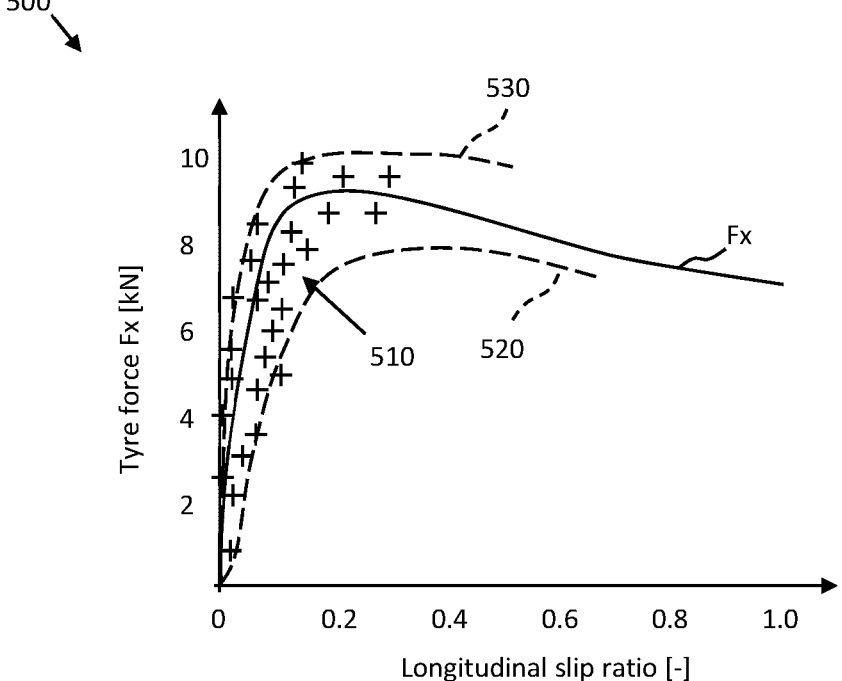
FIG. 5 illustrates adaptation of a wheel behavioral model to measurement data.

FIG. 5 is a graph 500 illustrating an inverse tyre model which maps longitudinal tyre force Fx to wheel slip. Measurements 510 of pairs (F, λ) of wheel slip with corresponding tyre force F are also plotted. According to some aspects, the control units disclosed herein are arranged to adapt the inverse tyre model $f^{-1}$ based on a measured wheel behavior and/or vehicle behavior in response to the control of the heavy duty vehicle 100 based on the equivalent wheel speed or wheel slip. One such type of measurement is the resistance encountered by an electric machine when trying to generate a particular wheel speed. This "torque status" output signal of the electric machine can be directly translated into an equivalent wheel force via the effective wheel radius R. The wheel force samples can also be obtained from the VMM function as part of the force allocation process. For instance, if the VMM notes that a too small longitudinal force is consistently obtained in response to a given requested wheel slip, then the model can be adjusted to account for the discrepancy, e.g., by scaling it to better match the desired wheel forces. In this context, it is noted that the inverse tyre model need not be correct in an absolute frame of reference, i.e., that the inverse tyre model is able to exactly predict the generated force in Newton for a given wheel slip. Rather, it is enough if the inverse tyre model is such as to allow successful control of the vehicle by the VMM function 260. Interestingly, by adjusting the inverse tyre model in this manner based on measured wheel force in response to wheel slip requests, other characteristics of the vehicle will automatically be included in the modelling to more accurately represent the mapping between wheel slip and wheel force.

In a first example of the adaptation of the inverse tyre model, sample pairs (F, λ) of generated force F vs current wheel slip λ are continuously obtained. Generated force F (both longitudinal Fx and lateral Fy) as well as yaw moments Mz can be determined based on vehicle behavior, i.e., Newtons second law type of relationships, where both mass m and accelerations a are possible to measure using basic sensor technology together with current wheel slip.

The inverse tyre model is then continuously updated to fit the current measurement results. For instance, a Kalman filter can be applied to track coefficients $\{c_i\}$ of a polynomial model which can then be used as inverse tyre model. A polynomial fit can also be made to fit measurement data 510 to a model, which model can then be used as the inverse tyre model.

In a second example a neural network or other form of AI-based method is applied to continuously update the inverse tyre model. The network is trained, e.g., using the sample pairs (F,λ) of generated force F vs current wheel slip λ. Input to the network can be, e.g., vehicle load, tyre specification, and road condition in terms of, e.g., friction. The output can be a set of coefficients for a polynomial model which can be used as a representation of the inverse tyre model.

It is appreciated that this model adaptation does not need to be performed on-board the vehicle 100. Rather, measurement data can be uploaded to the remote server 190 which can be tasked with finding a suitable model for controlling the vehicle based on wheel slip instead of based on torque request. This model can then account for measurement data from more than one vehicle, perhaps from a set of vehicles of the same type, or operational design domain. The model or sets of models can then be fed back from the remote server 190 to the vehicle to be used in control of the vehicle 100.

The whole inverse tyre model can of course also be realized as a neural network which is trained during different types of operating conditions. Then, as the operating conditions of the heavy duty vehicle changes, the inverse tyre model also changes such that the corresponding wheel slip for a given wheel force changes over time, which is an advantage.

The inverse tyre model $f^{-1}$ can also be adjusted to always lie within pre-determined upper and lower limits on wheel force in dependence of wheel slip or wheel speed. These limits may, e.g., be obtained as statistical limits derived from the measurement data 510. For instance, the upper and lower limits 520, 530 may be set so as to limit the inverse tyre model within one or two standard deviations from the mean, or the like.

Safety margins can also be applied to the adaptation itself, i.e., a constrained adaptation can be performed where the inverse tyre model is not permitted to deviate outside of a fenced region around some nominal model curve. This fenced region can be pre-determined or adjusted in accordance with operating condition, or by pre-defined dynamic driving tasks (DDTs) on known operational design domains (ODDs) which will reduce the required amount of verification and validation.

With reference again to FIG. 2, the MSD control unit 230 can be configured to control one or more MSDs associated with the wheel 210. The one or more MSDs may comprise at least one service brake 220 arranged to generate negative torque by the wheel 210, as well as propulsion units 250 arranged to generate a positive and/or a negative torque by the wheel 210, such as electric machines and/or a combustion engine. Other torque generating devices which may be controlled by an MSD control unit comprises engine retarders and power steering devices. The MSD control unit 230 is communicatively coupled to the VMM unit 260 for receiving control commands from the VMM unit 260 comprising wheel speed and/or wheel slip requests to control vehicle motion by the one or more MSDs.

Figure 6:
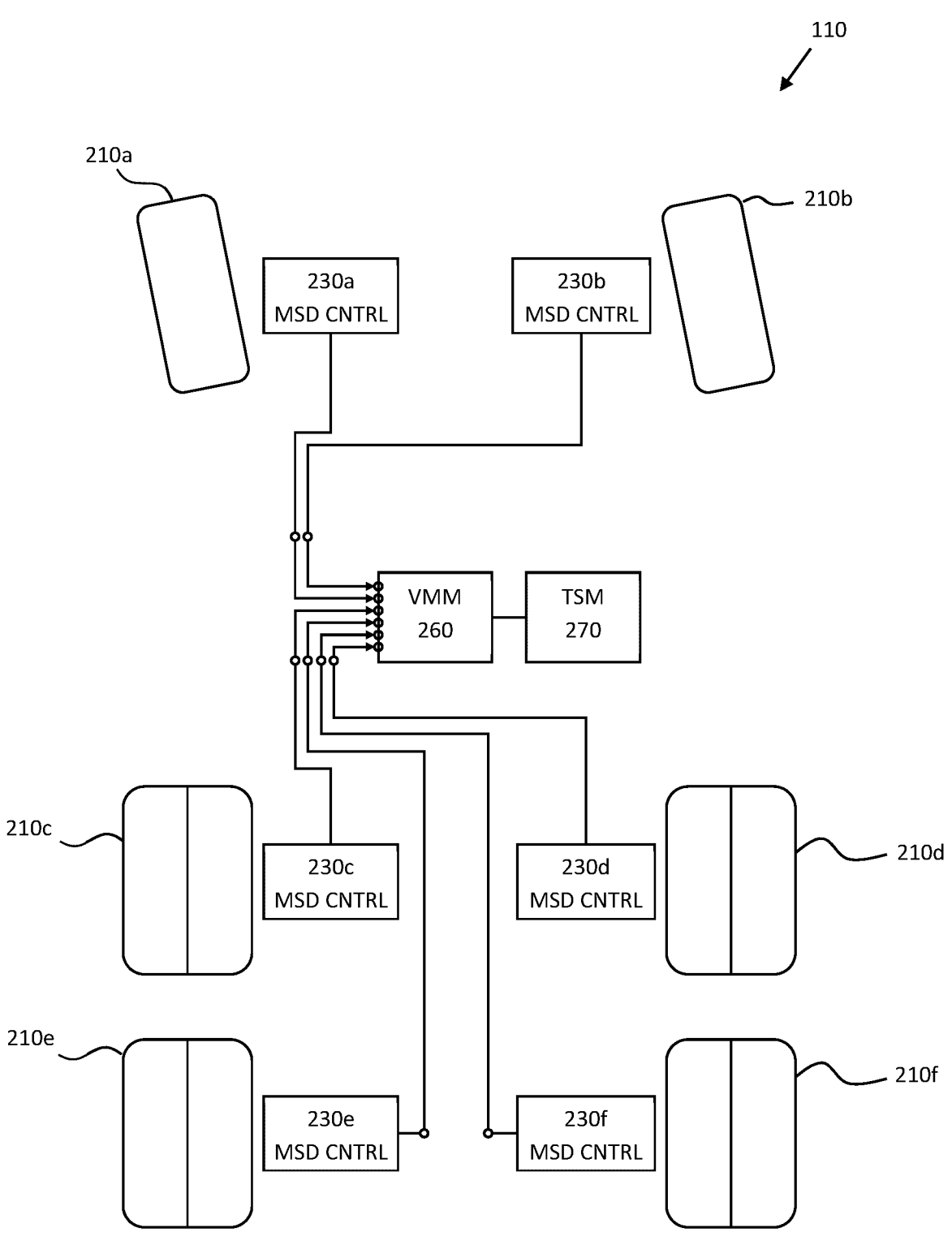
FIG. 6 shows an example motion support device control system.

It is appreciated that the MSD control units discussed herein may also be configured to control one or more MSDs associated with other wheels, in addition to the wheel 210, such as MSDs for controlling wheels of a given axle, or the wheels on one side of a trailer unit, or all wheels of a trailer unit. A system of MSD control units 230a-230f arranged to control respective wheels 210a-210f based on control signals received from a central VMM unit 260 is schematically illustrated in FIG. 6. One or more additional vehicle units, such as one or more trailers 120, possibly connected via dolly vehicle units, can also be controlled in this manner. In this case there may be more than one VMM function, where one VMM function can be assigned a master role and other VMM functions can be configured to operate in slave mode.

To summarize, the VMM function 260 performs force allocation to meet a certain acceleration profile and/or curvature profile. The forces are converted into equivalent wheel slip (or wheel rotational speed) and the slip or speed is sent to the MSD control unit 230 instead of a classical torque request. The conversion from desired force to equivalent slip or wheel rotational speed is performed based on an inverse tyre model $f^{-1}(\ )$. This inverse tyre model is not only a function of the requested wheel torque or wheel force, but also accounts for the current operating scenario in which the vehicle 100 is currently operating. According to an example embodiment, the inverse tyre model used to control the vehicle 100 is given by $$[\omega_{req}, F_{y,rem}, dF_x/d\omega, dF_y/d\omega] = f^{-1}(T_{req}, v_x, v_y, F_{z,act}, R_w, C_{est}, \mu_{est}, F_{y,min}, \alpha_{max})$$

where $T_{req}$—Torque request at the wheel $v_x$—Longitudinal speed over ground $v_y$—Lateral speed over ground $F_{z,act}$—Normal load on the wheel $R_w$—Rolling radius of the wheel $C_{est}$—Estimated tyre stiffness of the wheel (optionally any of lateral $C_{est,y}$ and longitudinal $C_{est}$,x tyre stiffness)

$\mu_{est}$—Estimated tyre road friction at the wheel $F_{y,min}$—Minimum required lateral force capacity $\alpha_{max}$—Maximum allowed lateral slip to achieve $F_{y,min}$ $\omega_{req}$—Wheel rotational speed request, i.e., a target wheel speed to be controlled against $F_{y,rem}$—Remaining lateral force capacity for given wheel $dF_x/d\omega$—Gradient of $F_x$ w.r.t to wheel speed at requested tyre operating point $dF_y/d\omega$—Gradient of $F_y$ w.r.t to wheel speed at requested tyre operating point The tyre stiffness $C_{est}$ may be an estimated tyre stiffness that can be corrected for factors like tyre wear, age, temperature, inflation pressure, etc. This can either be only the longitudinal slip stiffness which can be used as a basis to scale the lateral slip stiffness of a given tyre or a vector comprising both the longitudinal slip stiffness and the lateral slip stiffness of the tyre. Tyre stiffness may have a significant impact on the force to slip curve 400. Without this argument, a nominal stiffness of the tyre can be used in the tyre model.

The estimated friction, $\mu_{est}$ can be used to adapt the tyre force curve 400 to limit the peak force allowed and also to change the peak force slip position in the model. Without this optional input, a nominal dry asphalt tyre force curve can be used.

The minimum required lateral force capacity $F_{y,min}$ and maximum allowed lateral slip angle limit $\alpha_{max}$ are optional constraints to the tyre model which can be communicated via an interface like the interface 265 between the VMM function 260 and the various MSD control units 230. With these additional inputs, the generated longitudinal slip request is limited to a vector space where a lateral force capacity of $F_{y,min}$ is guaranteed using a maximum lateral slip angle of $\alpha_{max}$. Both these optional arguments can be used to request longitudinal force in a safe manner that does not cause significant yaw instability or the like. $F_{y,min}$ can be used to ensure that enough lateral force capacity remains to be able to take a particular corner or complete some other manoeuvre requiring the generation of lateral force (i.e. $F_y$) whereas $\alpha_{max}$ can be used to ensure that the yaw moment balance or the side-slip of the vehicle is maintained within reasonable pre-configured or dynamically determined limits. This feature may be of particular benefit in autonomous or functional safety critical applications where it is desired to keep the tyres operating in their linear combined-slip range (such as the range 410 shown in FIG. 3) and therefore preventing any traction control or yaw stability interventions.

On the output side, $\omega_{req}$ is a wheel speed request and this is the primary request from the tyre model which should result in the required $T_{req}$ as long it is possible to do so given $\mu_{est}$ and without violating the $F_{y,min}$ and $\alpha_{max}$ constraints. It is appreciated that a wheel speed request $\omega_{req}$ can be continuously updated over time in dependence of the speed over ground $v_x$, $v_y$ so as to be equivalent with a wheel slip, e.g., as defined in the wheel slip equation discussed above. Alternatively, a wheel slip value $\lambda_{req}$ can be communicated instead of the wheel speed value. Given wheel speed over ground, wheel slip and wheel speed are equivalent information quantities.

The remaining lateral force capacity $F_{y,rem}$ can be used to adjust bounds on the requests being sent or as feedback to the control allocator to adapt its control requests to increase $F_{y,rem}$, e.g., if it goes too close to zero.

Finally, $dF_x/d\omega$ and $dF_y/d\omega$ represent the gradient of the longitudinal and lateral forces w.r.t the wheel rotational speed $\omega_{tgt}$ at the requested operating point. These parameters can, e.g., be used to custom tune the gains to the speed controller in the actuator depending on the priority of control allocator. For instance, if the vehicle is cornering and the $dF_y/d\omega$ value is high, it indicates that poor speed control performance can degrade the lateral cornering performance and hence the gains for the speed controller can be adapted to prevent this.

Several variations of the function interface above are of course possible. One possibility is to simply remove the rolling radius input and change the torque and rotational speeds $T_{req}$, $R_w$ to force and linear speeds respectively, the inverse tyre model then becomes $$[(\omega_{req}, F_{y,rem}, dF_x/d\omega, dF_y/d\omega] = f^{-1}(F_{x,req}, v_x, v_y, F_{z,act}, C_{est}, \mu_{est}, F_{y,min}, \alpha_{max})$$

Another alternative is to simply send all the tyre parameters as a single structural argument (e.g., $p_{tyre}$) with a predetermined layout. Any values in the fields of the structure can be used to update the existing values whereas default values can be used in place of non-existing fields.

Other options for the outputs of the inverse tyre model can be to send actual or maximum lateral tyre force $F_{y,max}$ or current utilised tyre friction capacity $\mu_{y,util}$ in the y-direction. This would result in model functions according to $$[\omega_{req}, F_{y,act}, dF_x/d\omega, dF_y/d\omega] = f^{-1}(F_{x,req}, v_x, v_y, F_{z,act}, p_{tyre}, F_{y,min}, \alpha_{max})$$

$$[\omega_{req}, F_{y,max}, dF_x/d\omega, dF_y/d\omega] = f^{-1}(F_{x,req}, v_x, v_y, F_{z,act}, p_{tyre}, F_{y,min}, \alpha_{max})$$

$$[\omega_{req}, \mu_{y,util}, dF_x/d\omega, dF_y/d\omega] = f^{-1}(F_{x,req}, v_x, v_y, F_{z,act}, p_{tyre}, F_{y,min}, \alpha_{max})$$

As noted above, many of the inverse tyre model inputs and outputs in the above examples are optional. For instance, default values for the parameters $F_{z,act}$, $R_w$, $C_{est}$, $\mu_{est}$, $F_{y,min}$, $\alpha_{max}$ can be used instead of actual measured values. It is also appreciated that the outputs $F_{y,act}$, $dF_x/d\omega$, $dF_y/d\omega$ are not necessary for controlling the vehicle on the equivalent wheel speed or wheel slip corresponding to the desired wheel force.

It is also possible to add a steering angle request $\delta_{req}$ to the inverse tyre model, or a steering angle target value to be maintained. In this case the input comprises both required longitudinal $F_{x,req}$ as well as lateral $F_{y,req}$ wheel forces, and the output comprises a target steering angle $\delta_{tgt}$ for a given wheel in addition to the wheel speed or slip, i.e., $$[\omega_{req}, \delta_{req}, dF_x/d\omega, dF_y/d\omega] = f^{-1}(F_{x,req}, F_{y,req}, v_x, v_y, F_z, act, p_{tyre}, F_{y,min}, \alpha_{max})$$

It is furthermore appreciated that the wheel rotation speed $\omega_{req}$, i.e., the speed at which a given wheel 210 rotates, can be replaced with wheel slip A. This is because wheel speed request $\omega_{req}$ and wheel slip request $\lambda_{req}$ are directly related via wheel radius R given a wheel speed over ground $v_x$. In other words, wheel speed and wheel slip are often equivalent information quantities.

To summarize the discussions above, there is disclosed herein a control unit 130, 140 for controlling a heavy duty vehicle 100. The control unit is arranged to obtain input data indicative of a desired wheel force Fx, Fy to be generated by at least one wheel 210 of the vehicle 100, and to translate the input data into a respective equivalent wheel speed or wheel slip to be maintained by the wheel 210 to generate the desired wheel force Fx, Fy based on an inverse tyre model $f^{-1}$ for the wheel 210. The input data indicative of the desired wheel force to be generated may, for instance, be obtained from a force allocation process where the necessary forces to make the vehicle follow a desired acceleration profile and/or a desired curvature are determined. The acceleration profile and curvature may be obtained from manual control inputs by a driver of the vehicle 100, or from autonomous or semi-autonomous control algorithms running on a VUC. The desired wheel forces may also at least in part be obtained from a remote server 190 via wireless link.

The data indicative of the desired wheel force Fx, Fy may comprise a desired wheel torque Treq and a wheel rolling radius R. By supplying torque and radius, an equivalent desired wheel force may, e.g., be determined as Fx=Treq*R.

The control unit 130, 140 is arranged to obtain the inverse tyre model in dependence of a current operating condition of the wheel 210, and also arranged to control the heavy duty vehicle 100 based on the equivalent wheel speed or wheel slip. This means that the control unit is configured to adapt the inverse tyre mode to the current operating conditions of the vehicle in some way. For instance, if the vehicle is loaded with heavy weight cargo, then the inverse tyre model used to control the vehicle is adjusted to account for the change in operating condition. Various types of operating condition parameters may be considered, as will be discussed in the following. By obtaining the inverse tyre model in dependence of current operating conditions, a more accurate control can be achieved, and also a more robust control. Thus, it is appreciated that the inverse tyre models considered herein are dynamic models which, different from constant models, are adapted to fit the current operating conditions of the heavy duty vehicle. This improves both vehicle performance and safety.

The current operating condition may comprise a vehicle or wheel speed over ground vector with components $v_x$, $v_y$. This vehicle speed over ground can be used to determine a wheel rotational velocity corresponding to a given amount of slip, e.g., by computing the normalized wheel slip difference discussed above. Some tyres also behave a bit differently depending on if the wheel is rotating slowly or faster. Thus, some inverse tyre models may exhibit differences over an operating speed range from, e.g., 0 km/h over ground to say 150 km/h. It is appreciated that wheel control based on requested wheel rotational velocities requires a relatively fast interface between VMM function 260 and the MSD control unit 230. This is because the wheel rotational velocity required to obtain a given wheel slip depends on the velocity over ground, which may change relatively fast over time.

The current operating condition optionally also comprises a normal load Fz or vertical tyre force associated with the wheel 210. The normal load may have a significant effect on the inverse tyre model, i.e., the mapping between desired wheel force and wheel speed or wheel slip. For instance, the maximum available longitudinal tyre force Fx is limited by the normal force and friction coefficient. Thus, by parameterizing the inverse tyre model based on normal load Fz, a more accurate inverse tyre model can be obtained which more closely models the current operating conditions of the vehicle 100.

According to some other aspects, the current operating condition comprises an estimated tyre stiffness Cest of the wheel 210. If the tyre stiffness is explicitly estimated, then a more accurate inverse tyre model can be obtained. The tyre stiffness may, e.g., be estimated based on a feedback system, where measurements of tyre force is mapped against wheel slip, and a linear or semi-linear relationship can be determined. The tyre stiffness can also be obtained, e.g., from a database maintained in the remote server 190 or in a memory connected to the VUC, which can be indexed if the tyre can be identified. Identifying a tyre attached to a given wheel can, e.g., be done by embedding a radio frequency identification (RFID) device into the tyre, or by manual configuration.

The current operating conditions may furthermore comprise an estimated tyre road friction coefficient μ of the wheel. This road friction can be estimated in real time using known methods, such as those disclosed in, e.g., U.S. Pat. No. 9,475,500 B2, U.S. Pat. No. 8,983,749 B1 or EP 1719676 B1. The inverse tyre model can then be adapted to match the current road friction.

The current operating condition may furthermore comprise a minimum required lateral force capacity Fy,min and/or a maximum allowed lateral slip a of the wheel 210 of the wheel 210. The minimum lateral force capacity Fy,min and maximum lateral slip angle limit α are optional constraints to the tyre model. If this data is taken as input to the inverse tyre model function, then the output can be determined with these parameters as constraints. For instance, it can be ascertained that output wheel speeds or wheel slips are not such as to generate an insufficient lateral force capability, or lateral slip, which is an advantage.

Conversely, the inverse tyre model $f^{-1}$ can also be configured to provide a remaining lateral force capacity Fy,rem of the wheel 210. The remaining lateral force capacity Fy,rem can be used to adjust bounds on the requests being sent or as feedback to the control allocator to adapt its control requests to increase remaining lateral force capacity if it becomes too low.

The inverse tyre model $f^{-1}$ can also be configured to provide a gradient of the desired wheel force dFx, dFy with respect to wheel speed or wheel slip at a tyre operating point associated with the desired wheel force and the current operating condition of the wheel 210. The gradient provides information about the behavior of the model if a small change in input parameters is made, and can be used with advantage to adjust control algorithms in, e.g., the MSD control units 230. For instance, the gradients can be used to adjust a gain of a control function such as a PID controller.

Figure 7:
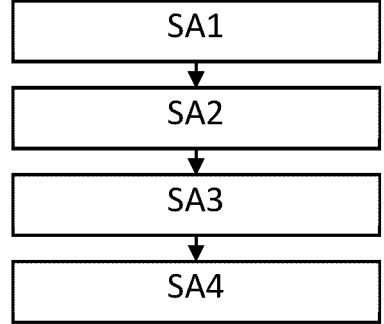
FIG. 7 is a flow chart illustrating a method.

FIG. 7 is a flow chart illustrating methods which summarize at least some of the discussions above. There is illustrated a method performed in a control unit 130, 140 for controlling a heavy duty vehicle 100. The method comprises obtaining S1 input data indicative of a desired wheel force Fx, Fy to be generated by at least one wheel 210 of the vehicle 100, and obtaining S2 an inverse tyre model $f^{-1}$ associated with the wheel 210, wherein the inverse tyre model in dependence of a current operating condition of the wheel 210. The method further comprises translating S3 the input data into a respective equivalent wheel speed or wheel slip to be maintained by the wheel 210 to generate the desired wheel force Fx, Fy based on an inverse tyre model for the wheel 210, and controlling S4 the heavy duty vehicle 100 based on the equivalent wheel speed or wheel slip.

Figure 8:
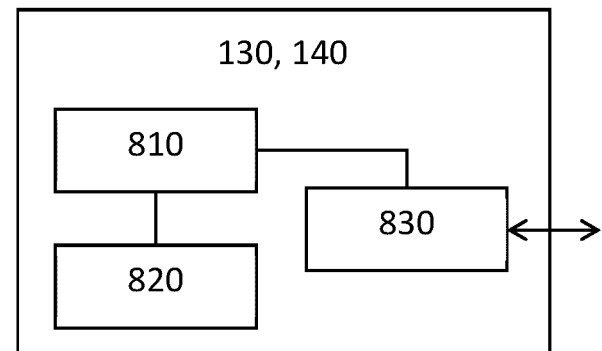
FIG. 8 schematically illustrates a control unit.

FIG. 8 schematically illustrates, in terms of a number of functional units, the components of a control unit such as the VUC 130, 140. The control unit may implement one or more of the above discussed functions of the TSM 270, VMM 260 and/or the MSD control function 230, according to embodiments of the discussions herein. The control unit is configured to execute at least some of the functions discussed above for control of a heavy duty vehicle 100. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 820. The processing circuitry 810 may further be provided as at least one application specific integrated circuit ASIC, or field programmable gate array FPGA.

Particularly, the processing circuitry 810 is configured to cause the control unit 101 to perform a set of operations, or steps, such as the methods discussed in connection to FIG. 7. For example, the storage medium 820 may store the set of operations, and the processing circuitry 810 may be configured to retrieve the set of operations from the storage medium 820 to cause the control unit 900 to perform the set of operations. The set of operations may be provided as a set of executable instructions. Thus, the processing circuitry 810 is thereby arranged to execute methods as herein disclosed.

The storage medium 820 may also comprise persistent storage, which, for example, can be any single one or combination of magnetic memory, optical memory, solid state memory or even remotely mounted memory.

The control unit 900 may further comprise an interface 830 for communications with at least one external device. As such the interface 830 may comprise one or more transmitters and receivers, comprising analogue and digital components and a suitable number of ports for wireline or wireless communication.

The processing circuitry 810 controls the general operation of the control unit 900, e.g., by sending data and control signals to the interface 830 and the storage medium 820, by receiving data and reports from the interface 830, and by retrieving data and instructions from the storage medium 820. Other components, as well as the related functionality, of the control node are omitted in order not to obscure the concepts presented herein.

Figure 9:
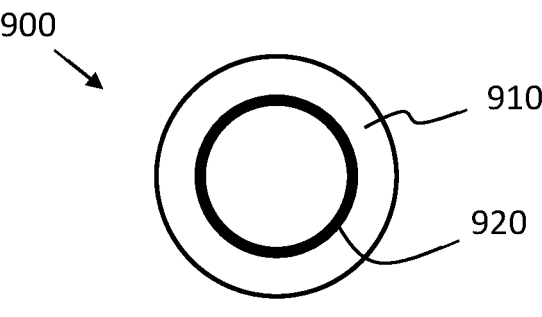
FIG. 9 shows an example computer program product.

FIG. 9 illustrates a computer readable medium 910 carrying a computer program comprising program code means 920 for performing the methods illustrated in FIG. 7, when said program product is run on a computer. The computer readable medium and the code means may together form a computer program product 900.

Figure 10:
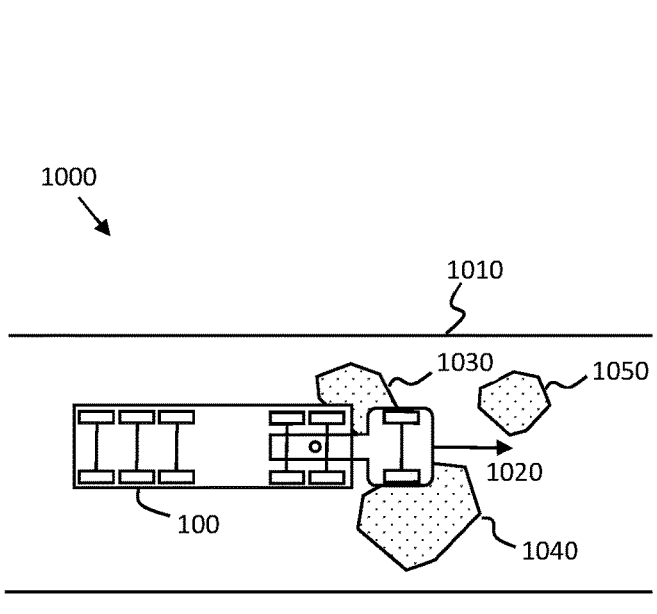
FIG. 10 illustrates a split friction road scenario.

FIG. 10 shows an example vehicle launch scenario 1000 where the techniques disclosed herein may be advantageously put to use. The vehicle 100 will here experience varying friction conditions 1030, 1040, 1050 as it is accelerated 1020. The road 1010 may also be uneven and/or sloping. A torque-based start control without wheel speed limits would face challenges since rapid control of wheel torque is required as the road or vehicle conditions change. For instance, the VMM may be operating at an update rate of about 10 ms while the MSD control unit 230 may be operating at an update rate of about 1 ms, i.e., ten times faster. This means that the MSD control unit 230 is able to adjust faster to transient effects and thereby overcome unforeseen resistances during vehicle start in a better way compared to the VMM-based control which will be slower to react to unforeseen changes in driving conditions. The proposed technique on the other hand simply determines suitable target wheel slip values to be maintained by the different MSD control units on each driven wheel, and communicates these target wheel slip values (or associated wheel speed limits determined based on the desired wheel slip values) to the MSD control units which then control the electric machines to maintain wheel slip at or below the requested values by setting appropriate wheel speeds in dependence of the vehicle speed and the configured target wheel slip or wheel slip limits. This way control is transferred down in the control stack closer to the actual electric machine, which improves overall vehicle startability. For instance, if the current motor speed at one or more wheels of the vehicle 100 in FIG. 10 is above an upper wheel speed limit the motor controller reduces the applied motor torque. The motor torque continues to be reduced until the motor speed is below or equal to the upper speed limit. Also, if the motor speed is measured as being below a lower speed limit then the torque applied to the electric machine shall be increased relative to the last time-step. The motor torque shall continue to be increased until the motor speed is above or equal to the lower speed limit.

Figure 11:
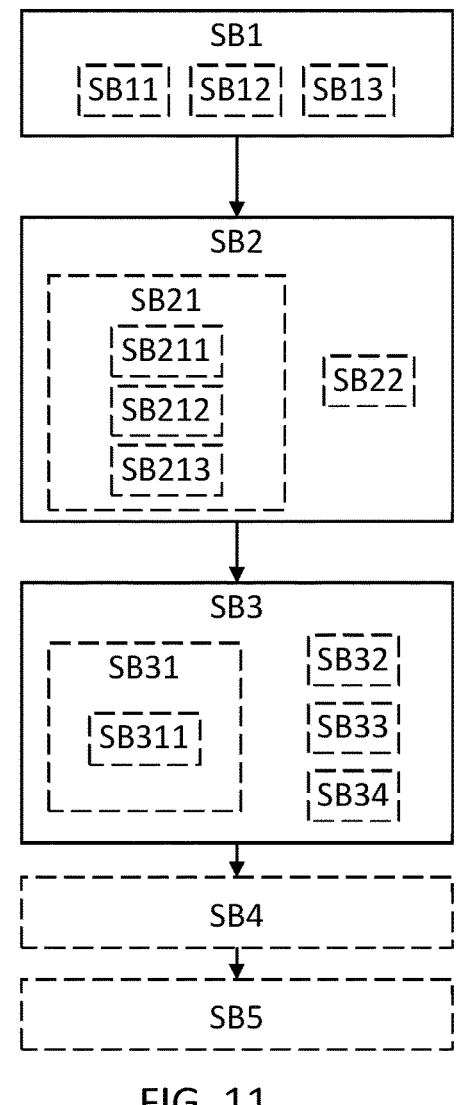
FIGS. 11-14 are flow charts illustrating methods.

FIG. 11 illustrates method for setting a heavy duty vehicle 100 in motion, the method comprises obtaining SB1 a motion instruction for setting the vehicle 100 in motion, determining SB2 a target wheel slip limit value $\lambda_{target}$ associated with a wheel slip suitable for executing the motion instruction, and controlling SB3 wheel speed $\omega$ to maintain wheel slip of the vehicle 100 below the target wheel slip limit value $\lambda_{target}$. The wheel slip limit, or, equivalently, a wheel speed limit value, can be configured in dependence of the wheel speed as discussed herein. For instance, in general, the wheel speed limits may be configured in dependence of a desired wheel slip such that excessive wheel slip does not occur. This way a controlled vehicle start is obtained in an efficient manner, since control is based directly on wheel speed with respect to the velocity of the vehicle, as opposed to torque-based control only. Control can be shifted more towards the propulsion unit or units and away from central vehicle control, which is an advantage since control loops of higher bandwidth (faster loops) can be realized in this manner. Unforeseen resistances and transients can be better handled due to the increased control bandwidth locally compared to centrally.

According to the present disclosure, the electric machine WEM is requested to maintain wheel slip below a target wheel slip limit value $\lambda_{target}$ which has been determined in dependence of a motion instruction for setting the vehicle in motion, or, equivalently, a target wheel speed limit corresponding to the wheel slip limit. The electric machine may for example simply apply a wheel speed close to the configures wheel speed limit value during the launch operation. For instance, if the target wheel slip limit value is set at 0.1, then the wheel rotational velocity will be continuously set by the WEM at a relative difference of 0.1 above the vehicle velocity so that the wheel will always be slipping by the configured amount or slightly less than the configured amount. In other words, a target wheel speed difference with respect to the velocity of the vehicle is configured and then controlled against. This is possible at least partly since the electric machine is capable of rapidly delivering high torque, i.e., it is normally capable of generating any wheel slip requested from it (although it would not be advisable to request too large slip, since this would result in tyre burnout). The peak torque capability of an electric machine is normally very high but can only be obtained for a limited duration of time. Thus, drawing on the high peak torque from the electric machine or machines during vehicle start may be advantageous.

Known methods of controlling vehicles during launch are instead based on torque control, meaning that the electric machines are sent torque requests which the electric machine then attempts to fulfill to the best of its ability under some slip limit constraint. Compared to the known methods for launching heavy duty vehicles, the proposed methods move control closer to the electric machines.

According to aspects, the method comprises controlling SB31 wheel speed $\omega$ to maintain wheel slip of a respective wheel of the vehicle 100 below the target wheel slip limit value $\lambda_{target}$ based on a relationship $$\omega = \frac{\lambda_{target} * v_{ref} + v_x}{R}$$

where $\omega$ represents wheel speed, $\lambda_{target}$ represents the target wheel slip limit value, $v_{ref}$ is a reference velocity, $v_x$ is vehicle velocity in the reference system of the wheel, and R represents wheel radius.

According to aspects, the motion instruction SB11 comprises a requested acceleration $a_{req}$ by the vehicle 100, and the target wheel slip limit $\lambda_{target}$ is determined SB21 in dependence of a longitudinal force Fx' required to reach the requested acceleration.

According to aspects, the method comprises determining SB212 the target wheel slip limit value $\lambda_{target}$ from the longitudinal force Fx' required to reach the requested acceleration and from a pre-determined relationship 400 between lateral force Fy and longitudinal wheel slip ratio.

According to aspects, the method comprises determining SB211 the longitudinal force Fx' required to reach the requested acceleration based on a relationship Fx'=m*$a_{req}$, where m is a mass of the vehicle 100 and $a_{req}$, is the requested acceleration by the vehicle 100.

According to aspects, the pre-determined relationship 400 between lateral force Fy and longitudinal wheel slip ratio is pre-configured SB213 in dependence of an estimated road condition.

According to aspects, the motion instruction SB12 comprises a requested end velocity $v_{req}$ by the vehicle 100, and the target wheel slip limit $\lambda_{target}$ is a pre-configured wheel slip limit value SB22.

According to aspects, the method comprises controlling SB311 wheel speed ω to maintain wheel slip of the vehicle 100 below the target wheel slip limit value A $\lambda_{target}$ based on the relationship $$\omega = \frac{\lambda_{target} * v_{ref} + v_x}{R}$$

where $v_{ref}$ is set to the requested end velocity $v_{req}$ by the vehicle 100.

According to aspects, the method comprises controlling SB32 wheel speed ω to maintain vehicle acceleration below a pre-configured maximum acceleration value.

According to aspects, the method comprises controlling SB33 wheel speed ω to maintain wheel speed below a pre-configured maximum wheel speed value.

According to aspects, the method comprises controlling SB34 vehicle velocity $v_x$ based on a torque request with a fixed wheel slip limit if the vehicle velocity $v_x$ is above a configured threshold velocity $v_{lim}$.

According to aspects, the motion instruction SB13 comprises a distance $d_{req}$ to be traversed by the vehicle 100 from standstill to standstill, the method comprising integrating SB4 wheel speed over time to reach the distance $d_{req}$ as $$d_{req}=\int \omega R dt$$

According to aspects, the motion instruction corresponds to a request for a peak torque to be applied for a limited period of time.

According to aspects, the method comprises transmitting SB5 a wheel speed request to an electric machine connected to drive wheels via an open differential arrangement, wherein the method comprises controlling wheel speed ω by the electric machine to maintain wheel slip of the vehicle 100 below the target wheel slip limit value $\omega_{target}$.

According to aspects, the method comprises increasing the target wheel slip limit value $\lambda_{target}$ from an initial value up to a pre-determined end value over a configured period of time.

Figures 12, 13:
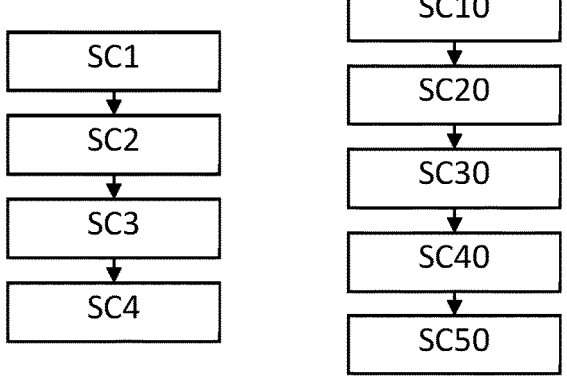

FIG. 12 illustrates a method for controlling at least one actuator 220, 250 of a vehicle 100, the actuator 220, 250 being configured to apply a torque on at least one wheel 210 of the vehicle 100. The applied torque is determined by a control function associated with a control bandwidth. The method comprises configuring SC1 the control function to control the applied torque to reduce a difference between a first parameter value related to a current rotational speed of the wheel 210 and a second parameter value related to target rotational speed limit of the wheel 210, obtaining SC2 data indicative of a current operating condition of the vehicle, and setting SC3 the control bandwidth of the control function in dependence of the current operating condition of the vehicle 100. The method also comprises controlling SC4 the actuator 220, 250 using the control function.

The control function should be construed as an operation functionality configured to apply a torque to the at least one actuator. By means of the control bandwidth, the torque can be applied with various response time depending on the current operating condition. According to an example, a decreased bandwidth may be associated with an increased torque response time for the actuator. Thus, the torque is applied more rapidly with an increased bandwidth. Moreover, the value related to a current rotational speed of the wheel as well as the value related to the target rotational speed of the wheel should be construed as values that could relate to both a rotational wheel speed as well as a wheel slip, i.e., a difference between the wheel speed over ground and the actual wheel speed. In the latter case, the first parameter may thus be a current wheel slip of the wheel, and the second parameter may be a target wheel slip of the wheel. An advantage is that the bandwidth is controlled based on the current operating condition, which will result in a rapid torque response when required and a lower, more moderate torque response in other situations. Thus, the comfort during operation is improved and the overall energy consumption for the vehicle can be reduced as a rapid, energy consuming operation is only performed when required. Furthermore, the increased configurability allows for additional degrees of freedom when optimizing vehicle control in general. Furthermore, the control function obtains parameters relating to the rotational speed of the wheel. A common approach for requesting a certain tyre force from a wheel is to use torque control at the actuator level based on torque requests sent from a higher layer control function. However, the latencies involved in the communication between the different control function, e.g., over a Controller Area Network (CAN) bus, significantly limits the slip control performance. Thus, a speed based control function is obtained which is advantageous in comparison to e.g. torque based control. In particular, for an electric machine, speed based control of wheel slip performed locally is more rapid compared to centrally managed torque control, primarily due to CAN message cycle time.

As will be described in further detail below, the method may preferably be executed using a vehicle motion management system and an actuator control system. The bandwidth may, when implementing such vehicle motion management system and actuator control system, be controlled in a number of different manners. For example, the vehicle motion management system can be arranged to transmit a control signal to the actuator control system, which signal comprises data relating to a target bandwidth, as well as a vehicle operating condition. The target bandwidth is thus set/determined by the vehicle motion management system. Based on the target bandwidth, the actuator control system determines, based on various parameters, a control bandwidth to achieve the target bandwidth.

The first parameter value mentioned above may for example be the rotational speed of the wheel or the current wheel slip of the wheel. The second parameter value may consequently be a target rotational speed of the wheel or a target wheel slip of the wheel.

FIG. 13 illustrates a method performed in an actuator control system for controlling at least one actuator 220, 250 to apply a torque on at least one wheel 210 of a vehicle 100. The actuator control system comprises a control function and the applied torque is determined by the control function in association with a control bandwidth. The method comprises determining SC10 a first parameter value related to a current rotational speed of the wheel 210, configuring SC20 the control function to control the applied torque to reduce a difference between the first parameter value and a second parameter value related to a target rotational speed of the wheel 210, and obtaining SC30 data indicative of a current operating condition of the vehicle. The method further comprises setting SC40 the control bandwidth of the control function in dependence of the current operating condition of the vehicle and controlling SC50 the actuator using the control function.

According to aspects, the control function is configured to control a speed of the actuator 220, 250.

According to aspects, an increased bandwidth of the control function is associated with an increased torque response for the actuator.

According to aspects, the control bandwidth of the control function is controlled using a predetermined set of feedback gains for the actuator, each feedback gain is associated with a specific operating condition of the vehicle.

According to aspects, the control function is a PID-controller.

According to aspects, the control function is a proportionality controller, the method further comprising obtaining a signal indicative of a target bandwidth for the control function and configuring the control function using the target bandwidth and a proportionality parameter relating to the current operating condition of the vehicle.

Figure 14:
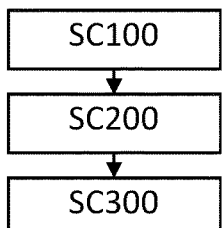

FIG. 14 illustrates a method performed in a vehicle motion management system 260 of a vehicle 100, the vehicle motion management system being connectable to an actuator control system for communication of control signals therebetween. The method comprises obtaining SC100 current speed of the vehicle 100, determining SC200 a current operating condition of the vehicle 100); and transmitting SC300 a control signal to the actuator control system. The control signal represents instructions which, when executed by the actuator control system, cause a control function of the actuator control system to apply a torque on at least one wheel of the vehicle for reducing a difference between a first parameter value related to a current rotational speed of the wheel based on the current speed of the vehicle and a second parameter value related to a target rotational speed of the wheel, in association with a control bandwidth. The control bandwidth is determinable in dependence of the current operating condition of the vehicle.

According to aspects, the method further comprises determining a target speed of the vehicle based on the current operating condition, where the target rotational speed of the wheel is based on the target speed of the vehicle.

According to aspects, the method further comprises determining, based on the current operating condition, a desired operation performance of the vehicle, where the control bandwidth is further determinable in dependence of the desired operation performance of the vehicle.

According to aspects, the method further comprises determining a target bandwidth and transmitting the control signal comprising the determined target bandwidth, where the control bandwidth is further determinable in dependence of the target bandwidth.

According to aspects, the current operating condition of the vehicle is based on at least one of a current vehicle condition and a current road condition at which the vehicle is operating.

According to aspects, the current operating condition is at least one of a current vehicle mass, an inclination of the road at which the vehicle is operating, vehicle speed, a friction level between the wheel of the vehicle and a road surface, and a current tire stiffness.

There is also disclosed herein an actuator control system of a vehicle 100, the actuator control system being configured to control at least actuator 220, 250 to apply a torque on at least one wheel of a vehicle. The actuator control system comprises a control function, and the applied torque is determined by the control function in association with a control bandwidth. The actuator control system is configured to determine a first parameter value related to a current rotational speed of the wheel, configure the control function to control the applied torque to reduce a difference between the first parameter value and a second parameter value related to a target rotational speed of the wheel, obtain data indicative of a current operating condition of the vehicle, set the control bandwidth of the control function in dependence of the current operating condition of the vehicle; and control the actuator using the control function.

There is also disclosed herein a vehicle motion management system 260 of a vehicle 100, the vehicle motion management system 260 being connectable to an actuator control system for communication of control signals therebetween, wherein the vehicle motion management system is configured to obtain a current speed of the vehicle, determine a current operating condition of the vehicle, and transmit a control signal to the actuator control system. The control signal represents instructions which, when executed by the actuator control system, cause a control function of the actuator control system to apply a torque on at least one wheel of the vehicle for reducing a difference between a first parameter value related to a current rotational speed of the wheel based on the current speed of the vehicle and a second parameter value related to a target rotational speed of the wheel, in association with a control bandwidth, the control bandwidth being determined in dependence of the current operating condition of the vehicle.

Furthermore, there is disclosed herein a control signal representing instructions to be executed by an actuator control system of a vehicle 100. The control signal comprises a vehicle speed component enabling the actuator control system to determine a current rotational speed of the wheel 210 and a vehicle operating condition component representing instructions. The instructions, when executed by the actuator control system, cause a control function of the actuator control system to apply a torque on at least one wheel of the vehicle for reducing a difference between a first parameter value related to a current rotational speed of the wheel based on the current speed of the vehicle and a second parameter value related to a target rotational speed of the wheel, in association with a control bandwidth, the control bandwidth being determinable in dependence of the current operating condition of the vehicle.

Figure 15:
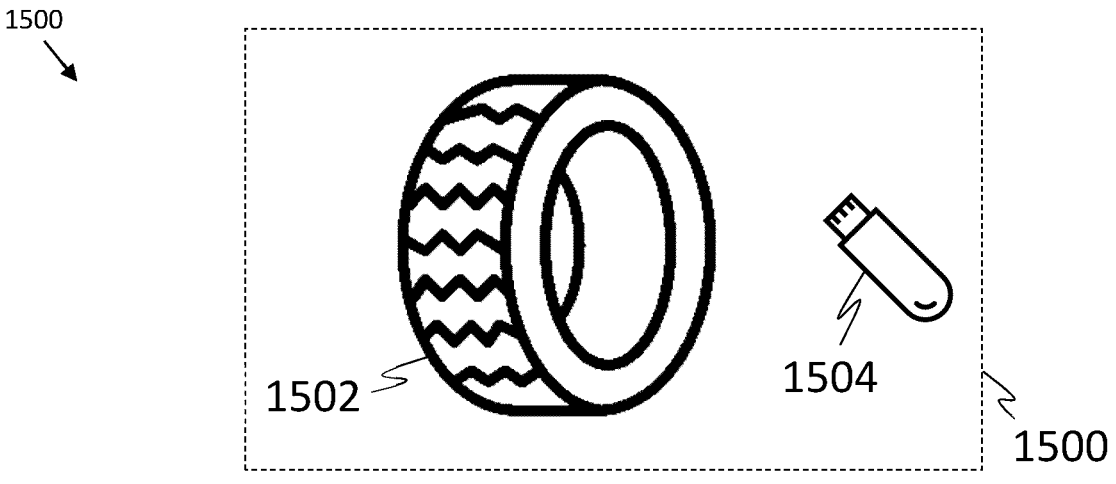
FIG. 15 illustrates a tyre.
Figures 16, 17, 18:
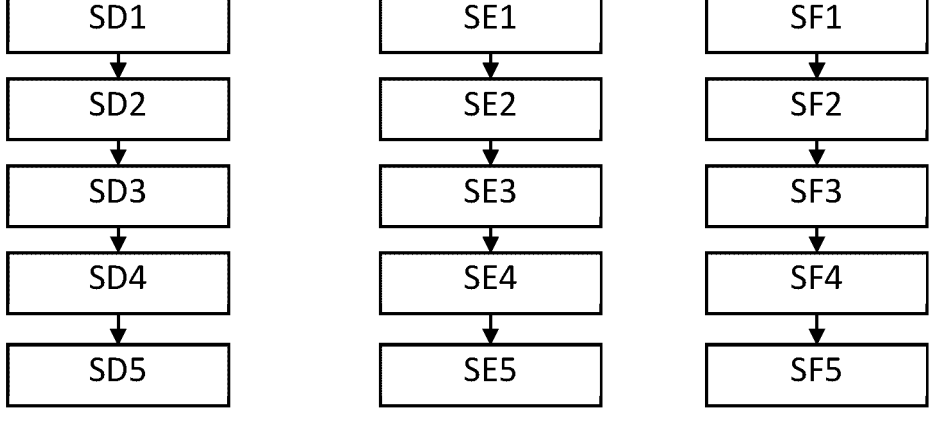
FIGS. 16-18 are flow charts illustrating methods.

With reference to FIGS. 8, 15 and 16, there is illustrated a control unit 130, 140 for controlling a vehicle wheel 210 provided with a tyre 1502. The control unit comprises or is operatively connected to a data storage 820, which data storage has a stored tyre model 400, 1504 for the tyre, wherein, in the tyre model, longitudinal tyre force Fx is represented as at least a function of longitudinal wheel slip A, longitudinal wheel slip being dependent on rotational speed of the wheel and velocity of the vehicle. The control unit is configured to receive at least one tyre parameter input, which tyre parameter input includes a measured value of at least one parameter which affects the longitudinal slip stiffness of the tyre and correct said function in the stored tyre model based on the received tyre parameter input. The control unit is also arranged to obtain or generate a wheel torque request, convert the obtained or generated wheel torque request to a wheel rotational speed limit request based on the corrected function, and send the wheel rotational speed limit request to an actuator for providing a rotational speed of the wheel below said wheel rotational speed limit request. This concept is based on the realization that the problem of latency may be avoided by providing the torque control at the same vehicle sub-system as the slip control. Such sub-systems have relatively short response times compared to the vehicle control unit from which torque requests are traditionally sent. More specifically, it has been realized that by using a tyre model in which a longitudinal tyre force is a function of at least the longitudinal wheel slip, a slip control sub-system can be used to provide a slip request which corresponds to a desired longitudinal force. In particular, it has been realized that, in addition to the advantage of providing fast response time, for such control to become accurate, the tyre model should be correctable based on one or more parameters that affect the slip stiffness of the tyre. Thus, in general terms, by adapting a force/slip-based tyre model to a current state of the tyre or current driving conditions, an accurate and fast control of the wheel is enabled. Wheel slip limit values and/or wheel speed limit values can be determined and configured in an analogous fashion.

As previously explained, in order to provide accurate control of a wheel 210 based on the tyre model 400, the tyre model should be updated to current conditions. Herein, control of the wheel is to be construed broadly to comprise control actions such as torque control where the applied torque is controlled to follow a target torque, speed control where the wheel rotational velocity is controlled to follow a target speed, or wheel slip control where wheel speed or torque is controlled to as closely as possible follow a target wheel slip. A tyre may be affected by various different factors, such as ambient temperature, inflation pressure, normal load, age, wear, etc. These and other factors may suitably be quantified as measurable parameters, and be provided as tyre parameter inputs. Accordingly, with reference to FIG. 3, when the VMM 260 obtains a wheel torque request or otherwise determines a desired tyre force to be generated at the wheel 210, it can convert the obtained wheel torque request or desired tyre force to a wheel rotational speed request or wheel slip request based on the corrected function of the tyre model. Equivalently, wheel speed limits and/or wheel slip limits can be determined and sent as requests to the MSD control unit 230.

According to aspects, the tyre 1502 forms part of a kit 1500 also comprising a tyre model 1504, the latter being illustrated in FIG. 15 by a flash drive (such as a USB flash drive). The tyre model signal 1504 may, however, be stored on various conceivable media, and is not necessarily delivered physically together with the tyre 1502, but may be accessible by downloading the tyre model 1504 from a remote server, or the like.

The at least one parameter is optionally selected from the group consisting of:

age $t_{act}$ of the tyre,
ambient temperature $T_{act}$,
inflation pressure $P_{act}$ of the tyre,
normal load on the tyre, and
wear of the tyre, suitably approximated as the distance $d_{act}$ travelled by the tyre.

According to aspects, the control unit is configured to correct said function in the stored tyre model 400 by applying a slip stiffness correction factor $c_p$, $c_T$, $c_a$, $c_w$ on said function, the slip stiffness correction factor having a variation with respect to the parameter.

According to aspects, the control unit is configured to receive a plurality of different tyre parameter inputs, each tyre parameter input including a measured value of a respective one of a plurality of parameters which affect the longitudinal slip stiffness of the tyre. The control unit is further configured to correct said function in the stored tyre model 400 by applying a combined correction factor on said function, the combined correction factor being a function of a plurality of slip stiffness correction factors, wherein each slip stiffness correction factor has a variation relative to a respective one of said plurality of parameters.

According to aspects, said at least one tyre parameter input is a primary tyre parameter input and said at least one parameter is a primary parameter, wherein the control unit is further configured to correct said function in the stored tyre model 400 based on at least one secondary tyre parameter input which secondary tyre parameter input includes a measured value of at least one secondary parameter, the at least one secondary parameter being selected from the group consisting of:
rolling radius,
nominal peak friction, and
rolling resistance coefficient.

According to aspects, the control unit 130, 140, is in its conversion of the wheel torque request to the wheel rotational speed request, configured to calculate a slip request based on the corrected function and to transform the slip request to the wheel rotational speed request using the slip formula:

$$\lambda = \frac{R\omega - v_x}{\max(|R\omega|, |v_x|)}$$

where $\lambda$ is the longitudinal wheel slip, where $R\omega$ is the rotational speed of the wheel, of which R is the wheel radius in meters and w is the angular velocity of the wheel, and where $v_x$, is the longitudinal speed of the wheel.

FIG. 16 illustrates a method for controlling torque applied to a vehicle wheel provided with a tyre, comprising receiving SD1 at least one tyre parameter input, which tyre parameter input includes a measured value of at least one parameter which affects the longitudinal slip stiffness of the tyre and correcting SD2 a tyre model for the tyre based on the received tyre parameter input, wherein in the tyre model, longitudinal tyre force is represented as a function of longitudinal wheel slip, longitudinal wheel slip being dependent on rotational speed of the wheel and velocity of the vehicle, wherein the step of correcting the tyre model comprises correcting said function. The method further comprises
obtaining or generating SD3 a wheel torque request, converting SD4 the obtained or generated wheel torque request to a wheel rotational speed request based on the corrected function, and sending SD5 the wheel rotational speed request to an actuator for providing a rotational speed of the wheel corresponding to said wheel rotational speed request.

According to aspects, said at least one parameter is selected from the group consisting of:

age of the tyre,
  ambient temperature,
  inflation pressure of the tyre,
  normal load on the tyre, and
  wear of the tyre, suitably approximated as the distance
    travelled by the tyre.

According to aspects, the act of correcting SD2 comprises applying a slip stiffness correction factor on said function, the slip stiffness correction factor having a variation with respect to the parameter.

According to aspects, the method also comprises receiving a plurality of different tyre parameter inputs, each tyre parameter input including a measured value of a respective one of a plurality of parameters which affect the longitudinal slip stiffness of the tyre, wherein said step of correcting comprises applying a combined correction factor on said function, the combined correction factor being a function of a plurality of slip stiffness correction factors, wherein each slip stiffness correction factor has a variation relative to a respective one of said plurality of parameters.

According to aspects, said at least one tyre parameter input is a primary tyre parameter input and said at least one parameter is a primary parameter, wherein the act of correcting SD2 comprises correcting said function in the stored tyre model based on at least one secondary tyre parameter input which secondary tyre parameter input includes a measured value of at least one secondary parameter, the at least one secondary parameter being selected from the group consisting of:

rolling radius,
  nominal peak friction, and
  rolling resistance coefficient.

According to aspects, the act of converting SD4 comprises calculating a slip limit request based on the corrected function and to transform the slip limit request to the wheel rotational speed limit request using the slip formula:

$$\lambda = \frac{R\omega - v_x}{\max(|R\omega|, |v_x|)}$$

where $\lambda$ is the longitudinal wheel slip, where $R\omega$ is the rotational speed of the wheel, of which R is the wheel radius in meters and $\omega$ is the angular velocity of the wheel, and where $v_x$, is the longitudinal speed of the wheel.

With reference to FIG. 2, according to a non-limiting example, the vehicle motion management system 260 comprises a torque module 202, a wheel slip module 204 and a friction module 206. The vehicle motion management system 260 is further arranged to receive vehicle operation signal s which comprises data operable by the vehicle motion management system 260 and its various modules 202, 204, 206. The vehicle operation signal s provided to the vehicle motion management system 260 may, for example, comprise data in the form of signals indicative of a current environment of the vehicle, a current traffic situation, vehicle weight parameter, such as e.g. if the vehicle is laden, unladen, partially laden, etc. The vehicle motion management system 260 may also receive other signals indicative of specific vehicle conditions, such as e.g. a current vehicle operating condition as will be described below. The torque module 202, the wheel slip module 204 and the friction module 206 are configured to transmit communication signals between one another, i.e. the different modules are configured to communicate with each other as will be evident by the following disclosure. It should be readily understood that the torque module 202, the wheel slip module 204 and the friction module 206 are illustrated as separate components merely for illustrative purposes. The vehicle motion management system 260 may of course also simply comprise various control functionalities itself which executes the below described functionalities.

According to another example, the vehicle motion management comprises normal driver control input, i.e., manual steering input, and acceleration and braking input indicative of the desired torque.

Thus, there is provided a vehicle motion management system for a vehicle, the vehicle motion management system being connectable to a motion support system for communication of control signals there-between, wherein the vehicle motion management system is configured to determine a desired torque for operating the vehicle at a current vehicle operating condition; determine a wheel slip limit for at least one wheel of the vehicle; determine, based at least on the wheel slip limit, a wheel speed limit for the at least one wheel of the vehicle; and transmit a control signal indicative of the desired torque and the wheel speed limit to the motion support system. The vehicle motion management system and the motion support system are control systems of the vehicle, where each of the control systems is arranged to execute various control functionalities for controlling operation of the vehicle, in particular for controlling wheel operations. The vehicle motion management system is preferably configured to receive, and to determine wheel parameters on a higher level, i.e. the vehicle motion management system determines a desired torque and wheel slip limit in a more generalized form, whereas the motion support system is arranged as a lower level control system configured to convert the parameters received from the vehicle motion management system to appropriate parameters for an actuator. The motion support system takes current driveline state(s) into account before forwarding an actuator signal to the actuator. The current driveline state may, for example, relate to a current vehicle transmission state, a gear stage for the vehicle transmission or a transmission clutch actuation state. The desired torque can, for example, be received from an operator of the vehicle pushing the accelerator pedal and/or pushing the brake pedal. The desired torque can also be received from a system autonomously controlling propulsion operation of the vehicle, or from an advanced driver assistance system (ADAS). The wheel slip limit should be construed as a maximum allowable wheel slip for the at least one wheel during operation. Wheel slip is the relative longitudinal motion between the wheel of the vehicle and the ground surface thereof, i.e. the amount of "skidding". The wheel slip can be determined as a relationship between the longitudinal speed of the wheel and the rotational speed of the wheel taking the wheel radius into account. Accordingly, the wheel speed limit is based on the wheel speed relative to the road surface as seen in a wheel based coordinate system. According to an example embodiment, the vehicle motion management system may be configured to determine a current rotational wheel speed and a current longitudinal wheel speed for at least one of the wheels of the vehicle; and determine a wheel slip for the at least one wheel based on the current rotational wheel speed and the current longitudinal wheel speed. As discussed above, a configured wheel slip limit is in many ways equivalent to a configured wheel speed limit, where the wheel speed limit is determined in real-time in dependence of the vehicle speed over ground.

The present disclosure is based on the insight that by transmitting a control signal indicative of a desired torque in combination with a wheel speed limit to the motion support system, the calculation of wheel slip limit can be executed by the higher level vehicle motion management system. When calculating wheel slip, the denominator in the wheel slip equation consists of the rotational wheel speed of the wheel. In low speed operation of the vehicle, the denominator is thus close to zero, or approaches zero which could result in a source of error when calculating wheel slip. Executing the wheel slip in the higher level vehicle motion management system is thus advantageous as potential inconsistencies in wheel slip calculation by separate motion support systems can be avoided. An improved wheel slip consistency is hereby achieved.

Furthermore, transmitting a control signal indicative of the desired torque and the wheel speed limit to the motion support system is particularly advantageous when operating the vehicle using electric machines, as electric machines are able to be speed- and torque controlled. As opposed to slip control, speed control can also be easier to achieve for e.g. service brakes, since rotation speed is a commonly used output of a tire torque balancing system and does not include any of the non-linearities which is present in a wheel slip equation.

According to an example embodiment, the wheel speed limit may be further based on the desired torque. Hereby, the desired torque, i.e. a torque request, is used for calculating a slip limit which slip limit is used when calculating the wheel speed limit.

According to an example embodiment, the wheel speed limit may comprise an upper wheel speed limit and a lower wheel speed limit. The vehicle motion management system may be further configured to transmit the upper wheel speed limit to the The following will now describe the functional operation of the vehicle motion management system 260. In particular, the vehicle motion management system 260 is arranged to receive an input signal with information relating to a current vehicle operating condition. The current vehicle operating condition may, for example, comprise data indicative of a wheel friction level between the wheel of the vehicle and the road surface, or the current weight of the vehicle, i.e. if the vehicle is unladen, laden or partially laden, or the topology of the road at which the vehicle is presently operating. The various operating conditions may thus be received by the vehicle motion management system 260 as individual components, or as a component using all different operating conditions as an overall vehicle operating condition. The different operating conditions for the vehicle can be determined using suitable sensors and transmitted to the vehicle motion management system 260.

As is described above, the vehicle motion management system 260 further comprises the friction module 206. According to an example embodiment, the vehicle motion management system 260 is arranged to, using the friction module 206, determine a wheel friction level between the at least one wheel and the road surface. The vehicle motion management system 260 can determine the current vehicle operating condition based on the determined wheel friction level.

The torque module 202 is adapted to determine a desired torque for operating the vehicle at the current vehicle operating condition. Hereby, the vehicle motion management system 260 determines a torque request, in the above described higher layer vehicle motion management system 260, for properly controlling the vehicle 100 at the current operating condition.

The desired torque may, for example, be determined based on a current accelerator pedal position, a brake pedal position, or based on a signal received from an autonomous vehicle operating system.

The wheel slip module 204 is arranged to determine a wheel slip limit for at least one wheel 210 of the vehicle 100. Thus, a maximum allowable wheel slip for the vehicle is determined, where the wheel of the vehicle is not allowed to exceed such wheel slip limit.

The wheel slip limit can be determined by using e.g. the model 400 discussed in connection to FIG. 4. The vehicle motion management system 260 can hereby convert a force request into a slip request, whereby a slip limit is set based on the slip request. According to another example, the slip limit can be set as a fixed value independently on the force request. The slip limit may also be based on a signal indicative of a current friction level between the road surface and the surface of the tire.

Based on the wheel slip limit, the wheel slip module 204 is configured to determine a wheel speed limit for the at least one wheel. Hereby, the vehicle motion management system 260 executes the wheel slip limit calculations and the wheel speed limit calculations. According to a non-limiting example, the wheel speed limit, $\omega_{w,\ si}$, can be determined based on below equation:

$$\omega_{w,sl} = \begin{cases} \dfrac{|V_{x,w}|\lambda_{lim} + V_{x,w}}{R_w}, & \lambda_{lim} \leq 0 \text{ and/or } T_{req} \leq 0 \\ \dfrac{V_{x,w}}{R_w(1 - \lambda_{lim})}, & \lambda_{lim} > 0 \text{ and/or } T_{req} > 0 \end{cases}$$

where:
$\lambda_{lim}$ is the wheel slip limit; and
$T_{reg}$ is the desired torque.

In the event the wheel speed is relatively low, i.e. close to zero, the vehicle motion management system 260 can be arranged to determine a wheel slip based on an offset wheel speed parameter, whereby an offset wheel speed limit can be calculated according to the below non-limiting equation:

$$\omega_{w,ol} = V_{x,w}/Rw + \max(|\lambda_{lim}|k_{ol}, \omega_{w,ol,max}) sqn(\lambda)$$

where:
$\omega_{w,ol}$ is the wheel speed limit calculated from the speed offset limit;
$k_{ol,w}$ and $\omega_{ol,max}$ are gain and maximum speed offset parameters used for transforming the slip limit to an offset limit; and
$sgn(\lambda)$ is a signum function which equals 1 during acceleration, and −1 during deceleration.

Moreover, the wheel speed limit may also comprise an upper wheel speed limit and a lower wheel speed limit, where the upper wheel speed is used during acceleration, i.e. during propulsion, and the lower wheel speed limit is used during deceleration, i.e. during braking. The upper wheel speed limit is used when the wheel slip limit is positive and the desired torque is above zero, i.e. during acceleration, while the lower wheel speed limit is used when the wheel slip limit is negative and the desired torque is below zero, i.e. during deceleration. Also, the wheel slip limit is within a predetermined range defined as:

$$-1 < \lambda_{lom} < 1$$

The characteristics of the wheel slip relative to the longitudinal and transversal tire forces is depicted in FIG. 4. Thus, FIG. 4 illustrates a model 400 representing the relationship between the calculated longitudinal wheel slip and the estimated longitudinal wheel force values. The model may also represent a relationship between the maximum available lateral wheel forces for a given longitudinal wheel slip. The model can also, for a predetermined lateral slip angle of the tire, represent the achieved lateral wheel force for a given longitudinal wheel slip. The vertical axis represents the tire force generated between the surface supporting the wheel and the wheel 210 itself, while the horizontal axis represents the longitudinal wheel slip of the wheel.

Referring again to FIG. 2, when the wheel speed limit and the desired torque have been determined, the vehicle motion management system 260 transmits a control signal via the interface 265 to the motion support system or MSD control unit 230, wherein the control signal is indicative of the desired torque and the wheel speed limit.

The motion support system 230 may comprise an actuator torque module. The actuator torque module is configured to determine an actuator specific torque, i.e. converts data of the desired torque from the vehicle motion management system 260 into data relevant for the actuator. In particular, the actuator torque module determines an operating torque based on the desired torque received from the vehicle motion management system 260 as well as based on the current driveline state of the vehicle 100.

The actuator torque module also determines an actuator rotational speed limit for the actuator 220, 250. The actuator rotational speed limit is based on the wheel speed limit received from the vehicle motion management system 260. The actuator rotational speed limit may also be based on the current driveline state. Hereby, the motion support system 230 has converted the wheel speed limit received from the vehicle motion management system 260 to a wheel specific rotational wheel speed limit.

The motion support system 230 thereafter transmits an actuator control signal 590 to the actuator 220, 250 to generate the operating torque on the wheel 210 without exceeding the actuator rotational speed limit.

To summarize, there is disclosed herein a vehicle motion management system 260 for a vehicle, the vehicle motion management system being connectable to a motion support system 230 for communication of control signals therebetween, wherein the vehicle motion management system is configured to determine a desired torque for operating the vehicle at a current vehicle operating condition, determine a wheel slip limit for at least one wheel of the vehicle, determine, based at least on the wheel slip limit, a wheel speed limit for the at least one wheel of the vehicle; and transmit a control signal indicative of the desired torque and the wheel speed limit to the motion support system 230.

According to aspects, the wheel speed limit is further based on the desired torque.

According to aspects, an upper and a lower wheel speed or wheel slip limit is determined and transmitted to the motion support system 230.

According to aspects, the wheel speed limit comprises an upper wheel speed limit and a lower wheel speed limit, the vehicle motion management system being configured to transmit the upper wheel speed limit to the motion support system 230 at least when the desired torque is above zero and transmit the lower wheel speed limit to the motion support system 230 at least when the desired torque is below zero.

According to aspects, the vehicle motion management system 260 is further configured to determine an offset wheel speed parameter, obtain a signal indicative of a wheel speed for the vehicle, and determine the wheel slip limit based on the offset wheel speed parameter when the wheel speed is below a threshold vehicle speed limit.

According to aspects, the vehicle motion management system 260 is further configured to determine a current rotational wheel speed and a current longitudinal wheel speed for at least one of the wheels of the vehicle, and determine a wheel slip for the at least one wheel based on the current rotational wheel speed and the current longitudinal wheel speed.

According to aspects, the wheel slip limit is within a predetermined wheel slip range.

According to aspects, the vehicle motion management system 260 is further configured to obtain a signal indicative of a current accelerator pedal position of an accelerator pedal of the vehicle, and determine the desired torque based on the current accelerator pedal position.

According to aspects, the desired torque is determined based on a signal received from an autonomous vehicle operating system.

According to aspects, the vehicle motion management system 260 is further configured to determine a wheel friction level between the at least one wheel and a road surface and determine the current vehicle operating condition based on the determined wheel friction level.

There is also disclosed herein a motion support system 230 for a vehicle, the motion support system 230 being connectable to a vehicle motion management system 260 and to at least one actuator configured to apply a torque to at least one wheel of the vehicle. The motion support system 230 is configured to receive a control signal from the vehicle motion management system 260, the control signal being indicative of a desired torque for operating the vehicle at a current vehicle operating condition, and indicative of a wheel speed limit for the at least one wheel of the vehicle, determine a current vehicle driveline state for the vehicle, determine, based on the current vehicle driveline state, the desired torque and the wheel speed limit, an operating torque and an actuator rotational speed limit, and transmit an actuator signal to the actuator for the actuator to generate the operating torque on the at least one wheel without exceeding the actuator rotational speed limit.

According to aspects, the current vehicle driveline state is one of a current vehicle transmission state, a gear stage for the vehicle transmission or a transmission clutch actuation state.

According to aspects, the wheel motion system 230 is a decentralized wheel motion system 230 connectable to a wheel specific actuator configured to control a single wheel of the vehicle.

FIG. 17 illustrates a method for controlling an actuator of a vehicle, the actuator being configured to apply a torque on at least one wheel 210 of the vehicle, wherein the method comprises determining SE1 a desired torque for operating the vehicle at a current vehicle operating condition, determining SE2 a wheel slip limit for the at least one wheel of the vehicle, determining SE3, based at least on the wheel slip limit, a wheel speed limit for the at least one wheel of the vehicle, determining SE4 an operating torque and an actuator rotational speed limit based on the desired torque, the wheel speed limit and a current vehicle driveline state, and controlling SE5 the actuator to generate the operating torque on the at least one wheel without exceeding the actuator rotational speed limit.

It is noted that the torque request may originate from a propulsion management system (which may not be considering lateral motion etc). The wheel speed limits or wheel slip limits may be converted to a motor speed limit in a straight forward manner. Thus, such limits are considered equivalent herein. Also, as discussed herein, a 'speed offset' may be used instead of a wheel slip at lower speeds.

There is disclosed herein a control signal representing instructions to be executed by a motion support system 230, the control signal comprising a torque component enabling the motion support system 230 to determine an operating torque and a wheel speed limit component representing wheel speed limit data which, when executed by the motion support system 230, cause the motion support system 230 to generate an actuator signal corresponding to the operation torque subject to an actuator rotational speed limit, which is determinable based on the wheel speed limit component in view of a current vehicle driveline state.

There is furthermore disclosed herein a motion support device, MSD, control unit 230 for a heavy duty vehicle 100, configured to control one or more MSDs 220, 250 associated with at least one wheel 210 on the vehicle 100, wherein the MSD control unit 230 is arranged to be communicatively coupled 265 to a vehicle motion management, VMM, unit 260 for receiving control commands from the VMM unit 260 comprising wheel speed limit and/or wheel slip limit requests to control vehicle motion by the one or more MSDs 220, 250, where the MSD control unit 230 is arranged to obtain a capability range indicating a range of wheel behaviors of the wheel 210 for which the VMM unit 260 is allowed to influence the behavior of the wheel by the control commands, and wherein the MSD control unit 230 is arranged to monitor wheel behavior and to detect if wheel behavior is outside of the capability range, where the MSD control unit 230 is arranged to trigger a control intervention function in case the monitored wheel behavior is outside of the capability range.

According to aspects, the one or more MSDs comprises at least one service brake 220 arranged to generate negative torque by the wheel 210.

According to aspects, the one or more MSDs comprises at least one propulsion unit 250 arranged to generate a positive and/or a negative torque by the wheel 210.

According to aspects, the capability range comprises an upper limit on allowable positive and/or negative longitudinal wheel slip and/or wheel rotational speed.

According to aspects, the capability range comprises an upper limit on allowable positive and/or negative longitudinal wheel acceleration.

According to aspects, the capability range comprises an upper limit on allowable positive and/or negative vehicle yaw rate.

According to aspects, the capability range comprises a lower limit on allowable positive and/or negative longitudinal wheel slip and/or wheel rotational speed.

According to aspects, the capability range comprises a lower limit on allowable positive and/or negative longitudinal wheel acceleration.

According to aspects, the capability range comprises a lower limit on allowable positive and/or negative vehicle yaw rate.

According to aspects, the MSD control unit 230 is arranged to receive wheel speed data associated with the wheel 210 from a wheel speed sensor 240, and to detect if wheel behavior is outside of the capability range based on the wheel speed data.

According to aspects, the MSD control unit 230 is arranged to obtain a fixed capability range as a parameter loaded from memory or received from an external configuration entity.

According to aspects, the MSD control unit 230 is arranged to continuously obtain an updated capability range.

According to aspects, the control intervention function comprises executing an intervention function by one or more of the MSDs 220, 250.

According to aspects, wherein the control intervention function comprises triggering a request to an external arbitrator function for direct MSD control by the MSD control unit 230.

According to aspects, the MSD control unit 230 is arranged to monitor wheel behavior by filtering samples of wheel behavior over time, and to detect if wheel behavior is outside of the capability range based on the result of the filtering.

There is also disclosed herein, a vehicle motion management, VMM, unit 260 arranged to perform vehicle motion management for controlling motion of a heavy duty vehicle 100 by one or more motion support devices, MSDs, 220, 250 associated with at least one wheel 210 on the vehicle 100, wherein the VMM unit 260 is arranged to be communicatively coupled 265 to an MSD control unit 230 for transmitting control commands comprising wheel speed and/or wheel slip requests to the MSD control unit 230 to control vehicle motion by the one or more MSDs 220, 250, wherein the VMM unit 260 is arranged to obtain a capability range indicating a range of wheel behaviors of the wheel 210 for which the VMM unit 260 is allowed to influence the behavior of the wheel by the control commands, and wherein the VMM unit 260 is arranged to generate the control commands such that the wheel behavior is within the capability range.

According to aspects, the VMM unit 260 comprises an arbitrator function configured to receive a request for direct MSD control by the MSD control unit 230 and to cede vehicle control to the MSD control unit 230 in case wheel behavior is outside of a pre-determined wheel behavior safety range.

FIG. 18 illustrates a method for controlling motion by a heavy duty vehicle 100, the method comprising:

configuring SF1 a motion support device, MSD, control unit 230 to control one or more MSDs 220, 250 associated with at least one wheel 210 on the vehicle 100, configuring SF2 a vehicle motion management, VMM, unit 260 to perform vehicle motion management by the one or more MSDs 220, 250 via control commands transmitted to the MSD control unit 230, defining SF3 a capability range indicating a range of wheel behaviors of the wheel 210 for which the VMM unit 260 is allowed to influence the behavior of the wheel by the control commands, monitoring SF4 wheel behavior, and triggering SF5 a control intervention function by the MSD control unit 230 in case the monitored wheel behavior is outside of the defined capability range.

The invention claimed is:

1. A vehicle motion management system for a vehicle, the vehicle motion management system being connectable to a motion support system for communication of control signals therebetween, wherein the vehicle motion management system is configured to:

determine a desired torque for operating the vehicle at a current vehicle operating condition;

determine a wheel slip limit for at least one wheel of the vehicle;

determine, based at least on the wheel slip limit and the desired torque, a wheel speed limit for the at least one wheel of the vehicle; and transmit a control signal indicative of the desired torque, the wheel speed limit and a rotational acceleration limit to the motion support system.

2. The vehicle motion management system according to claim 1, wherein the wheel speed limit is further based on a current wheel speed.

3. The vehicle motion management system according to claim 2, wherein the wheel speed limit comprises an upper wheel speed limit and a lower wheel speed limit, the vehicle motion management system being configured to:

transmit the upper wheel speed limit to the motion support system at least when the desired torque is above zero; and transmit the lower wheel speed limit to the motion support system at least when the desired torque is below zero.

4. The vehicle motion management system according to claim 1, wherein the vehicle motion management system is further configured to:

determine an offset wheel speed parameter;

obtain a signal indicative of a wheel speed for the vehicle; and determine the wheel slip limit based on the offset wheel speed parameter when the wheel speed is below a threshold vehicle speed limit.

5. The vehicle motion management system according to claim 1, wherein the vehicle motion management system is further configured to:

determine a current rotational wheel speed and a current longitudinal wheel speed for at least one of the wheels of the vehicle; and determine a wheel slip for the at least one wheel based on the current rotational wheel speed and the current longitudinal wheel speed.

6. The vehicle motion management system according to claim 1, wherein the wheel slip limit is within a predetermined wheel slip range.

7. The vehicle motion management system according to claim 1, wherein the vehicle motion management system is further configured to:

obtain a signal indicative of a current accelerator pedal position of an accelerator pedal of the vehicle; and determine the desired torque based on the current accelerator pedal position.

8. The vehicle motion management system according to claim 1, wherein the desired torque is determined based on a signal received from an autonomous vehicle operating system.

9. The vehicle motion management system according to claim 1, wherein the vehicle motion management system is further configured to:

determine a wheel friction level between the at least one wheel and a road surface; and determine the current vehicle operating condition based on the determined wheel friction level.

10. A motion support system for a vehicle, the motion support system being connectable to a vehicle motion management system and to at least one actuator configured to apply a torque to at least one wheel of the vehicle, wherein the motion support system is configured to:

receive a control signal from the vehicle motion management system, the control signal being indicative of a desired torque for operating the vehicle at a current vehicle operating condition, and indicative of a wheel speed limit for the at least one wheel of the vehicle, the wheel speed limit being based at least on a wheel slip limit and the desired torque;

determine a current vehicle driveline state for the vehicle;

determine, based on the current vehicle driveline state, the desired torque and the wheel speed limit, an operating torque and an actuator rotational speed limit; and transmit an actuator signal to the actuator for the actuator to generate the operating torque, on the at least one wheel without exceeding the actuator rotational speed limit and a rotational acceleration limit.

11. The motion support system according to claim 10, wherein the current vehicle driveline state is one of a current vehicle transmission state, a gear stage for the vehicle transmission or a transmission clutch actuation state.

12. The motion support system according to claim 10, wherein the wheel motion system is a decentralized wheel motion system connectable to a wheel specific actuator configured to control a single wheel of the vehicle.

13. A method for controlling an actuator of a vehicle, the actuator being configured to apply a torque on at least one wheel of the vehicle, wherein the method comprises:

determining a desired torque for operating the vehicle at a current vehicle operating condition;

determining a wheel slip limit for the at least one wheel of the vehicle;

determining, based at least on the wheel slip limit and the desired torque, a wheel speed limit for the at least one wheel of the vehicle;

determining an operating torque and an actuator rotational speed limit based on the desired torque, the wheel speed limit and a current vehicle driveline state; and controlling the actuator to generate the operating torque, on the at least one wheel without exceeding the actuator rotational speed limit and a rotational acceleration limit.

14. A control signal representing instructions to be executed by a motion support system, the control signal comprising:

a torque component enabling the motion support system to determine an operating torque; and a wheel speed limit component representing wheel speed limit data and a rotational acceleration limit which, when executed by the motion support system, cause the motion support system to generate an actuator signal corresponding to the operation torque subject to an actuator rotational speed limit, which is determinable based on the wheel speed limit component in view of a current vehicle driveline state the wheel speed limit component being based at least on a wheel slip limit and the desired torque.

* * * * *